(12) United States Patent
Jamison

(10) Patent No.: US 12,103,690 B2
(45) Date of Patent: Oct. 1, 2024

(54) ICE DETECTION AND PRECAUTIONARY SYSTEM SHUT-DOWN EVENT REDUCTION SYSTEMS AND RELATED METHODS

(71) Applicant: Government of the United States, as represented by the Secretary of the Air Force, Wright-Patterson AFB, OH (US)

(72) Inventor: David Jamison, Luther, OK (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 584 days.

(21) Appl. No.: 17/509,214

(22) Filed: Oct. 25, 2021

(65) Prior Publication Data

US 2022/0135237 A1 May 5, 2022

Related U.S. Application Data

(60) Provisional application No. 63/109,883, filed on Nov. 5, 2020.

(51) Int. Cl.
| | | |
|---|---|---|
| *B64D 15/20* | (2006.01) | |
| *B64C 19/00* | (2006.01) | |

(Continued)

(52) U.S. Cl.
CPC .............. *B64D 15/20* (2013.01); *B64C 19/00* (2013.01); *F01D 21/14* (2013.01); *F01D 25/02* (2013.01); *F03D 80/40* (2016.05); *G01K 13/02* (2013.01)

(58) Field of Classification Search
CPC ............................... B64D 15/20; B64D 33/02; B64D 2033/0233; B64C 19/00; F01D 21/14;

(Continued)

(56) References Cited

U.S. PATENT DOCUMENTS

| | | | |
|---|---|---|---|
| 4,333,004 A | 6/1982 | Forgue et al. | |
| 4,745,804 A | 5/1988 | Goldberg et al. | |

(Continued)

FOREIGN PATENT DOCUMENTS

| | | | | |
|---|---|---|---|---|
| CN | 110132146 A | | 8/2019 | |
| CN | 111751075 A | * | 10/2020 | ............... B64F 5/60 |
| EP | 2650665 A2 | | 10/2013 | |

OTHER PUBLICATIONS

Integrated Icing Solutions, LLC, Ice Detection Monitor, published on the internet by Integrated Icing Solutions, LLC, on Integrated Icing's website Oct. 12, 2021.

(Continued)

*Primary Examiner* — Peter J Macchiarolo
*Assistant Examiner* — Anthony W Megna Fuentes
(74) *Attorney, Agent, or Firm* — AFMCLO/JAZ; Jeffrey V. Bamber

(57) ABSTRACT

Ice detection test apparatuses, systems, and methods are disclosed. In some cases, ice detection and precautionary system shut-down event reduction systems and related methods are provided. The system utilizes a turbine engine ice detection apparatus that includes and engine pressure simulation device, an air moving device, and a first air pressure sensor associated with the engine pressure simulation device. The embodiment further includes an ice monitor controller that receives inputs from the first air pressure sensor and at least one second sensor located adjacent a turbine engine intake. The ice monitor controller performs comparisons of inputs from these sensors against each other and stored values to determine actual icing conditions then generate warnings on a display to an operator. The exemplary control section has multiple modes including manual, semi-manual and automatic.

22 Claims, 16 Drawing Sheets

(51) Int. Cl.
- *B64D 33/02* (2006.01)
- *B64F 5/60* (2017.01)
- *F01D 21/14* (2006.01)
- *F01D 25/02* (2006.01)
- *F03D 80/40* (2016.01)
- *G01K 13/02* (2021.01)
- *G01M 9/04* (2006.01)
- *G01M 15/14* (2006.01)
- *F01D 21/00* (2006.01)
- *F01D 21/10* (2006.01)
- *F01D 21/20* (2006.01)

(58) Field of Classification Search
CPC ........ F01D 25/02; F01D 21/003; F01D 21/10; F01D 21/20; F03D 80/40; G01K 13/02; G01M 15/14; G01M 9/04; G01M 15/02; G01M 15/00; G01M 9/02; F05D 2260/12; F05D 2260/83; Y02E 10/72; B64F 5/60; F02B 37/24; F02B 37/225; F02C 9/28; F02C 9/00; F02C 3/04; F02C 6/12; F02C 7/00; F02C 6/14; F02C 3/00; G01D 21/00; G01D 18/00; G01D 11/24; G01D 11/245

See application file for complete search history.

(56) References Cited

U.S. PATENT DOCUMENTS

| | | |
|---|---|---|
| 5,182,944 A | 2/1993 | Brunnenkant |
| 8,200,451 B2 | 6/2012 | Battisti |
| 9,156,557 B2 | 10/2015 | Penny et al. |
| 10,274,436 B2 | 4/2019 | Jean et al. |
| 2008/0257033 A1 | 10/2008 | Roberts |
| 2011/0138772 A1* | 6/2011 | Zitouni .............. F01N 5/04 60/725 |
| 2013/0068045 A1* | 3/2013 | Masters .............. G01M 9/04 73/865.6 |
| 2017/0216637 A1* | 8/2017 | Raimarckers ........ G01M 9/04 |

OTHER PUBLICATIONS

Marcus Morton, Tinker Engineer's Invention Challenges Mother Nature's Authority, Defense Visual Information Distribution Service (DVIDS), Apr. 6, 2021, published on the internet by Air Force Research Laboratory at https://www.dvidshub.net/news/393176/tinker-engineers-invention-challenges-mother-natures-authority.

European Patent Office International Searching Authority, International Search Report and Written Opinion for PCT version of the present patent application, mailed Apr. 26, 2022.

* cited by examiner

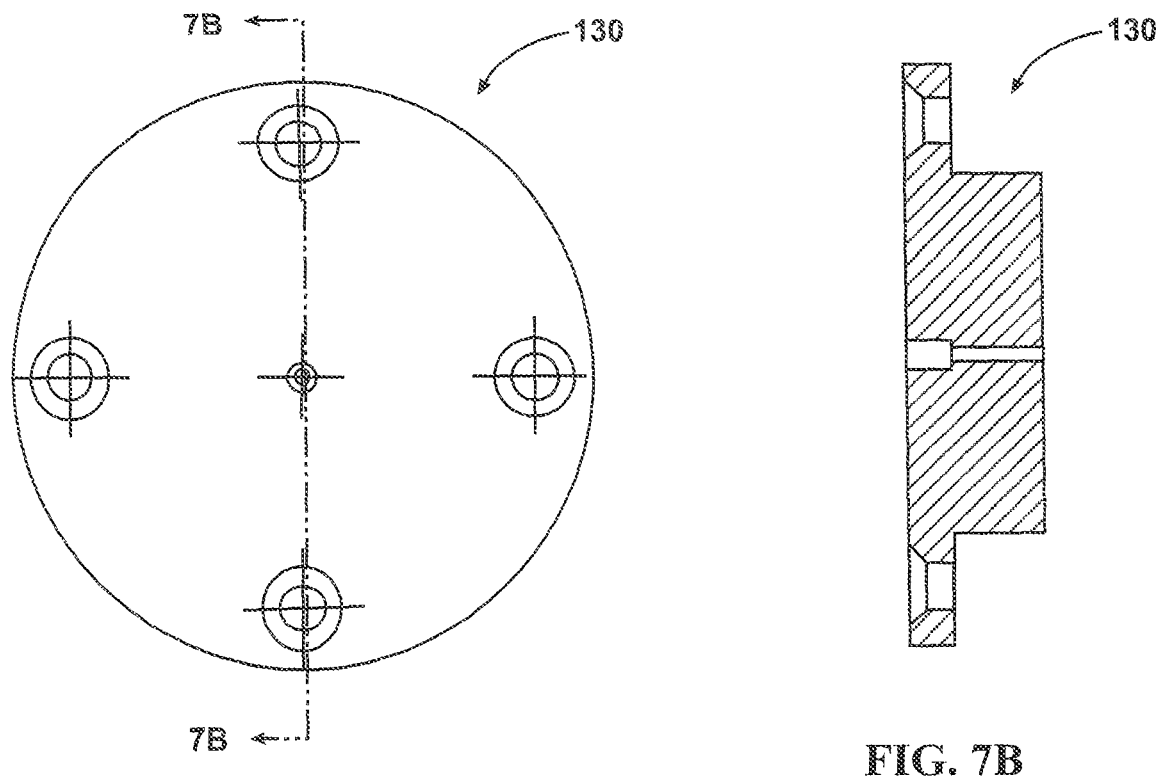
FIG. 7A
FIG. 7B
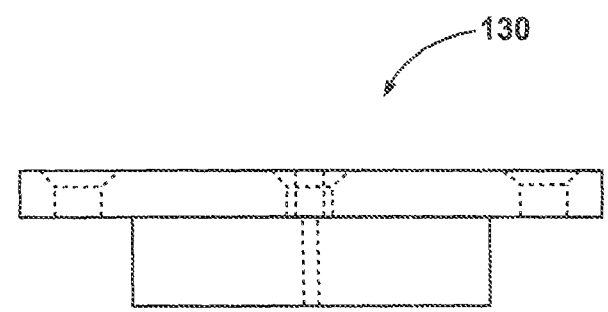
FIG. 7C

ICE DETECTION AND PRECAUTIONARY SYSTEM SHUT-DOWN EVENT REDUCTION SYSTEMS AND RELATED METHODS

Pursuant to 37 C.F.R. § 1.78(a)(4), this application claims the benefit of and priority to prior filed co-pending Provisional Application Ser. No. 63/109,883, filed Nov. 5, 2020, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to testing of components that can be damaged from icing conditions and, more particularly, to the testing of machines and systems with rotational components that can be damaged from icing conditions.

BACKGROUND OF THE INVENTION

The present invention relates to reducing avoidable or unnecessary precautionary shut-downs of systems that include components that can be damaged from icing conditions. For example, such systems that can be at risk from icing conditions include systems with rotational components including jet turbine, axial flow turbine, turbojet, turboprop, or turbofan engines. Situations where such systems can be shut down as a precaution against damage include systems that are tested in conditions where ice might form, e.g., in an inlet area of a jet engine. Icing on jet turbines can present a foreign object damage (FOD) risk if damaging ice forms undetected.

In the late fall, winter and early spring, when conditions meet icing conditions described in the technical data, typically temperatures around forty degrees Fahrenheit (about 4.4° C.) and lower with humidity above twenty percent, there is a potential for ice to form in jet engine inlet areas which can include a jet engine test cell bellmouth coupled to the engine or flight cowling as well as blades and/or vanes (e.g., stators, variable stators, etc.) of jet engines during performance testing. Icing conditions can occur in testing facilities, installed on an aircraft wing, and in outdoor test cells. Due to aerodynamics of an exemplary engine inlet, air accelerates toward an exemplary jet engine compressor section causing air pressures and temperatures to drop. Temperature can drop enough that ice will form on, adjacent to, or in the jet engine intake area or section (which can include internal vanes or blades) when ambient air temperatures outside the jet engine air intake section are above freezing (e.g., air temperature external to a test facility or air temperatures in test cell air intake section or inlet stack).

When installed on an aircraft, an engine can have an ice prevention or anti-icing system that can include a system that vents hot air into the engine flight cowling coupled to the jet engine intake thereby warming that area and keeping ice from forming in an air path upstream, within, or adjacent to the jet engine intake section. In the test cell, when engines are operated to determine serviceability, the engine cannot receive injected hot air or bleed air from the compressor section, where typical warm air is often extracted. Introducing heated air into the engine under test for the purposes of ice prevention or mitigation would invalidate the engine performance test data thereby creating false test results that cannot be relied upon to evaluate engine test performance.

Exemplary original equipment manufacturer (OEM) instructions that define testing and serviceability acceptance limits for a jet engine test specify what qualifies as icing conditions. These instructions were drafted based on icing condition data testing done during engine development and are conservative/risk averse to avoid shedding of ice from engine inlet sections or areas thereby causing engine damage during test run operation. These OEM instructions include icing condition predictive tables that are based on highly conservative or icing risk averse assumptions such as an assumption that an engine under test will be operated with various worst-case scenario settings, e.g., maximum airflow or engine power setting conditions, resulting in a lowest expected pressures and lowest expected temperatures.

However, in a typical or exemplary engine run, the jet engine being tested will be configured to maintain maximum power for a minimal, rather than maximum, amount of time with most time spent between idle and eighty percent power. With most of the engine run occurring at less than full power, icing may not occur. If icing is light, it may not have time to form before the intake warms due to a reduction in power settings. Accordingly, the highly risk averse assumptions that the OEM icing predictive tables are based do not align with actual operational conditions or power settings, including power settings and duration of power settings profile(s), that are typically found or used in an actual engine test. Accordingly, an operator of an engine test cell that relies upon the OEM icing predictive tables may perform an unnecessary and costly precautionary shut down of engine test cell operations in situations where the engine under test would not actually form damaging ice accumulations that could result in ice shedding and ingestion of damaging ice into rotating engine blades. The cost of icing damage to engines is high (millions of dollars) and could also pose a risk to human safety. Thus, engineers and manufacturers of both engines and test cells teach away from challenging these assumptions.

Therefore, a need exists for improved systems and methods of testing components that are subject to damage from icing conditions, which avoid unnecessary precautionary shut-downs of such components while being tested.

SUMMARY OF THE INVENTION

While the invention will be described in connection with certain embodiments, it will be understood that the invention is not limited to these embodiments. To the contrary, this invention includes all alternatives, modifications, and equivalents as may be included within the spirit and scope of the present invention.

The present invention is directed to ice detection test apparatuses, systems, and methods. In some cases, the present invention is used for precautionary system shut-down event reduction purposes. A turbine engine ice detection test apparatus is provided that may be positioned in proximity to a jet engine test cell air inlet, or adjacent to an aircraft. The test apparatus may comprise an engine pressure simulation device configured for simulating conditions at the air intake of a turbine engine. An air moving device may be connected to the engine pressure simulation device for moving air through the engine pressure simulation device. The air moving device is adjustable to adjust the air flow through the engine pressure simulation device to approximate the engine pressures of a turbine engine being tested. The test apparatus may further comprise a first air pressure sensor disposed relative to the engine pressure simulation device to measure air passing through the engine pressure simulation device. An exemplary ice detection test apparatus can include various ice monitor sensor array sensors (IMSA) which may include one or more of ice, static pressure, total pressure, and temperature sensors (the first set or plurality of sensors).

An engine ice detection system is provided that comprises the ice detection test apparatus described above and an ice monitor controller. The ice monitor controller may be in communication with the first air pressure sensor and with at least one second sensor located adjacent a turbine engine intake. The ice monitor controller may also be in communication with the air moving device. The ice monitor controller may be configured to operate the air moving device and receive inputs from the first air pressure sensor and the at least one second sensor. The second sensor can comprise part of a second set of sensors positioned in proximity with a turbine engine air inlet, which may comprise static pressure and total pressure sensors. The ice monitor controller may perform comparisons of inputs from the first air pressure sensor and the at least one second sensor against each other and stored values to determine whether actual icing conditions exist on a turbine engine intake. The ice monitor controller may generate warnings on a display to an operator. The ice monitor controller may have multiple modes including manual, semi-manual, and automatic.

A method of ice detection on a turbine engine that has an air intake and draws air from an outside environment is also provided. In one embodiment, the method comprises the steps of:

(a) providing a turbine engine test system comprising a turbine engine test apparatus that simulates the conditions at the air intake of the turbine engine and comprises a first air pressure sensor, and positioning the test apparatus in a location that is spaced away from the turbine engine and is in the presence of air that is representative of the air that will be drawn into the intake of the turbine engine;

(b) running a turbine engine so that air moves through its air intake, and receiving information on the air pressure at the air intake;

(c) moving air through the turbine engine test apparatus to produce an air pressure in the test apparatus that approximates the air pressure at the air intake of the turbine engine; and (d) determining whether icing conditions are developing in the test apparatus, and comparing inputs from the first air pressure sensor and the information on the air pressure at the air intake of the turbine engine against each other and stored values to determine whether actual icing conditions exist on the turbine engine intake.

In other embodiments, the method may comprise a step of operating the ice detection test apparatus before starting the turbine engine (or without starting and running the turbine engine) to determine whether icing conditions could occur during an engine run, without the possibility of damaging the engine.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIG. 7A is a front view of an exemplary pressure static (Psw) probe.

FIG. 7B is a cross-sectional view of the pressure static probe shown in FIG. 7A taken along line 7B-7B.

FIG. 7C is a side view of the pressure static probe shown in FIG. 7A.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The present invention is directed to ice detection test apparatuses, systems, and methods. In some cases, the present invention is used for reduction of precautionary system shut-down events. The embodiments of the invention described herein are not intended to be exhaustive or to limit the invention to precise forms disclosed. Rather, the embodiments selected for description have been chosen to enable one skilled in the art to practice the invention. Although the invention has been described in detail with reference to certain embodiments, variations and modifications exist within the spirit and scope of the invention as described and defined in the following claims.

The ice detection test apparatuses, systems, and methods can be used in any suitable use environment. The apparatuses, systems, and methods can be used to test any types of systems with rotational components that can be at risk from icing conditions including jet turbine, axial flow turbine, turbojet, turboprop, or turbofan engines. The term "turbine engines" will be used herein to describe all of these types of engines. In some cases, the apparatuses, systems, and methods can be used when testing an engine in an engine test cell. In other cases, the apparatuses, systems, and methods can be located adjacent to an aircraft, such as on the ramp, when the aircraft is on the ground at an airport or air base. The apparatuses, systems, and methods can be used in testing any type of aircraft engines, including military and commercial aircraft.

Figure 1:
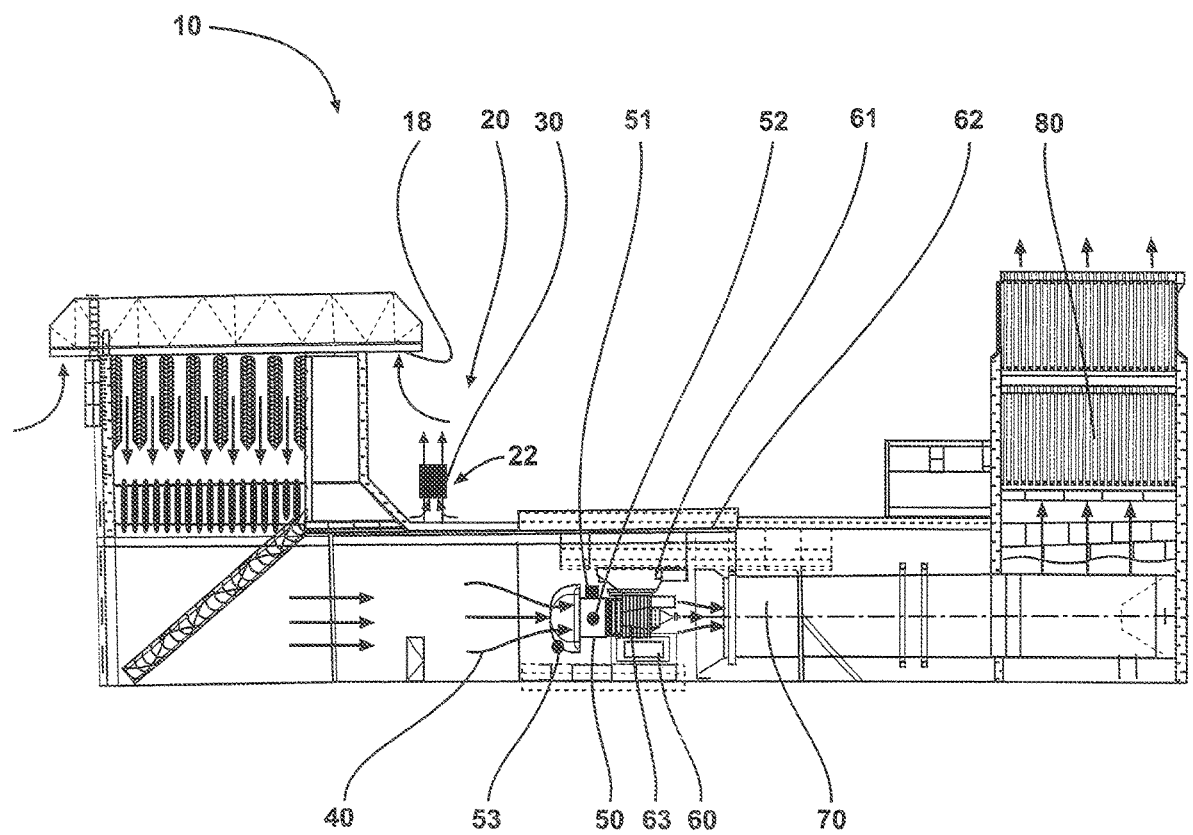
FIG. 1 is a simplified cross-sectional view of a test cell with exemplary embodiment components.

FIG. 1 is a simplified cross-sectional view of a test cell 10 with exemplary components. The test cell 10 includes an engine adapter 61 that holds the engine 63 under test and an engine adapter mount 62. A bellmouth engine intake adapter 50 is attached to a front section of the engine under test. Alternatively, a flight inlet nacelle (not shown) can substitute for the bellmouth engine intake adapter 50. Test cell 10 enables an engine under test to draw ample air 40 from an inlet stack 18 that is then directed into the engine's intake adapter 50. Air 40 passing through the engine is compressed, burned, and exhausted at high speed towards an augmenter tube 70. Once in the tube 70, exhaust and entrained air passes out of the test cell 10 facility through an exhaust stack 80. The control of the engine occurs in the control room 60, where data is collected and control of the test occur. The test cell control room 60 is provided with control equipment, instrumentation, and may have a window that allows operators to view the engine under test within the test cell.

The components of the test cell 10 described above will not be considered to be part of the system unless specifically included in the body of one or more of the appended claims (as opposed to the preamble). In addition, any components of the test cell 10 will only be considered to be part of the system of those claims that contain the components of the test cell in the body thereof, and will not be considered to be part of the system in any other claims that do not contain such components in the body thereof.

Turbo jet engines work by taking in large amounts of air and ejecting that mass at high speed and high temperature due to combustion. In the test cell, the air accelerates as it approaches the intake and the first stage of compression. Due to the increased velocity, the pressure inside the intake drops as the speed increases. This is demonstrated by Bernoulli's principle.

$$P1 - P2 = \tfrac{1}{2}\rho(v_2^2 - v_1^2) \text{ and } A_2 V_2 = A_1 V_1, \text{ where:}$$

ρ=air density
P1=pressure upstream
P2=pressure in convergent-divergent structure throat
V1, v1 flow velocity upstream
V2, v2=flow velocity in convergent-divergent structure throat
$A_1$=area upstream
A2=area of throat The equation above shows that as area decreases, velocity increases and as velocity increases pressures decrease.

When the pressure drops, it causes a lowering of temperature. This is shown by the general gas equation:

$P^{\gamma-1} T^{\gamma}$=Constant—P is the pressure of the gas, T is absolute temperature of the gas, and $^{\gamma}$ is isentropic expansion factor.

A remaining variable required for potential for icing in the inlet of an engine is the presence of water vapor in the air. As temperature decreases, the ability of the air to hold water decreases. As a result of the air accelerating, the water held will begin to precipitate inside the intake and ice can begin to form. If not monitored, the ice can reach a substantial thickness that when liberated from the intake can cause engine damage or foreign object damage (FOD).

Due to this hazard, the Technical Orders (TO) developed by the Air Force (similar to the OEM tables described above) detail the conditions where icing might occur. This information and knowledge of the intake conditions enable one to put together limits that define testing conditions where the potential of ice formation could occur in the intake. All engine geometries are different, so their unique inlet conditions result in different icing limits. It should be noted that when not being tested for performance, the aircraft and engine have numerous anti-ice systems that keep the airframe and engine intake free of ice. A unique situation occurs during jet engine testing where typical anti-ice bleed air from the compressor is not allowed. The extraction of compressed air would cause the compressor to appear to be less efficient, resulting in flawed testing results.

The currently used method of predicting ice formation during engine testing is conservative due to limitations in the TO. The conservative predictions stem from a complexity that is not captured in tables. During an engine test, airflows are constantly changing resulting in a complication that makes prediction of icing difficult. As mentioned above, as air accelerates, its temperature and pressure decrease. The icing conditions in the TO, however, do not list throttle or airflow in these tables so the assumption is that the limits are based on full power airflow rates. The engine test either for seal break-in or performance run is at full power for a short period of time. The ice detection system described herein is designed to address these limitations and regain much of the time that is lost waiting for icing conditions that may never occur. The ice detection apparatus does not estimate but measures ice formation and accretion rates, considering real time airflow rates associated with the engine inlet. These are the areas where the ice detection system can regain lost testing time, while continuously monitoring for conditions that are dangerous to the engine.

The ice detection system 20 comprises several components that are shown separately in different drawing figures.

These components include an engine ice detection test apparatus 22 (shown in FIGS. 1, 1A, and other figures) that is designed to simulate the conditions at the intake of the engine being tested. The test apparatus 22 comprises: an engine pressure simulation device 32 (one embodiment of which is shown in FIG. 2B and FIGS. 3A-C); an air moving device 90 connected to the engine pressure simulation device 32 for moving air through the engine pressure simulation device engine pressure simulation device 32; and an ice monitor sensor array (IMSA) 30 comprising a first sensor or set of sensors that are positioned to measure air passing through the engine pressure simulation device 32. The system further comprises an ice monitor controller (or control) 150 (FIG. 4) in communication with the first sensor or set of sensors and with at least one second sensor located adjacent a jet engine intake 50. The ice monitor controller is also in communication with the air moving device 90. The ice monitor controller 150 receives inputs from the first sensor or set of sensors and at least one second sensor, and performs comparisons of inputs from the first sensor or set of sensors and at least one second sensor against each other and stored values to determine whether actual icing conditions exist on a jet engine intake.

Figure 1A:
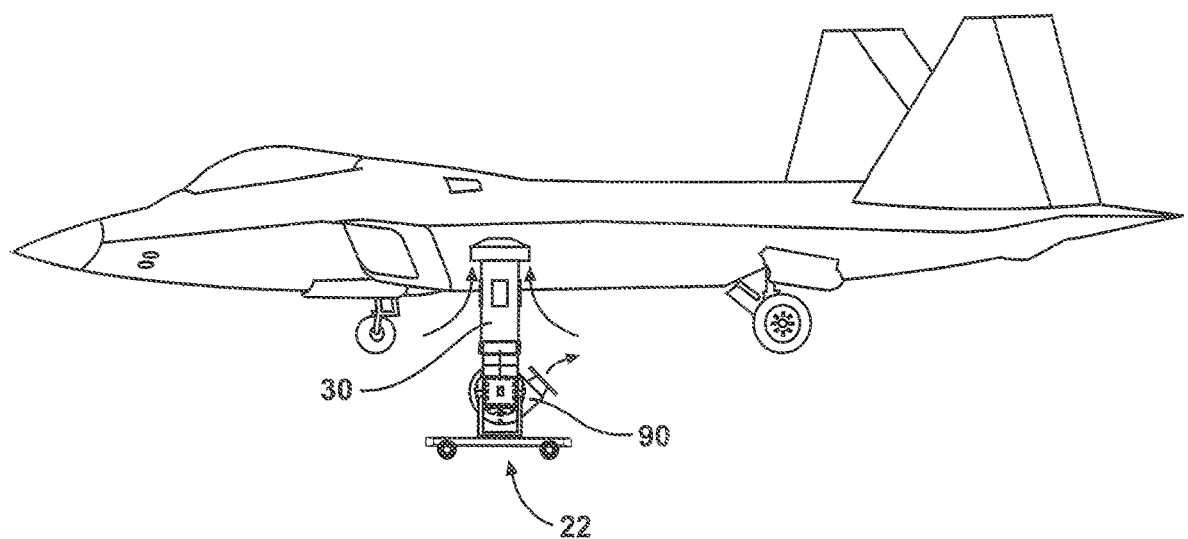
FIG. 1A is perspective view of an airplane on a ramp and a portable jet engine ice detection test apparatus.

FIG. 1 shows an exemplary location where an embodiment of the ice detection test apparatus 22 with the IMSA 30 may be positioned in relation to the test cell 10. The ice detection apparatus 22 should be positioned (typically outdoors) in an area where the surrounding air will be representative of the air drawn into the air intake of the engine being tested. That is, the surrounding air should be the same temperature and humidity of the air drawn into the air intake of the engine being tested. The ice detection apparatus 22 should be spaced a sufficient distance away from the jet engine being tested so that it is beyond (that is, out of) the influence of the engine being tested (since the engine being tested will typically create low pressure conditions when it is running). In the case of an engine being tested in a test cell, FIG. 1 shows the ice detection test apparatus 22 may be positioned in proximity to a jet engine test cell air inlet stack 18 so that the ice detection test apparatus 22 is sampling inlet air in close proximity to the inlet 18. In some cases, at least a portion of the engine 63 may be inside a building and the apparatus may be outside the building. In the case of an engine on an aircraft being tested when the aircraft is on the ground, the ice detection test apparatus 22 may be located adjacent to the aircraft as shown in FIG. 1A.

Figure 2:
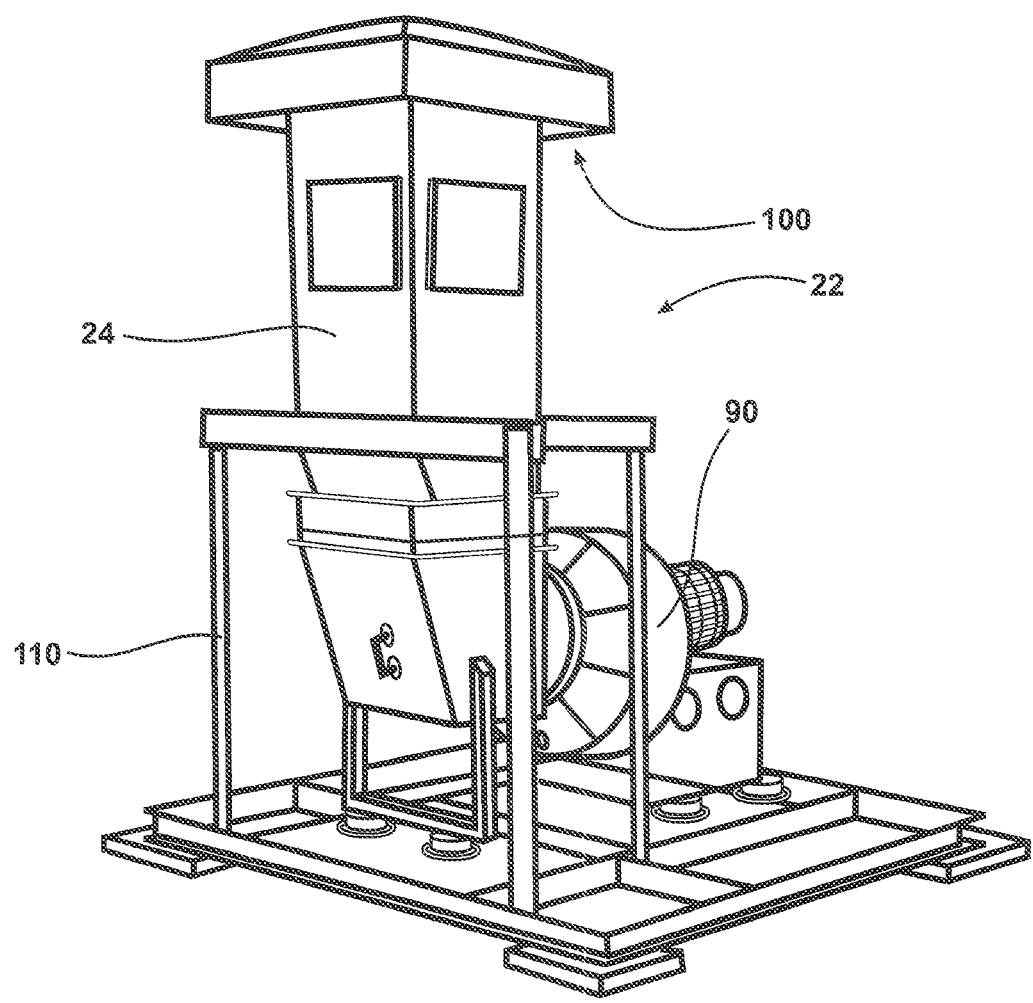
FIG. 2 is a perspective view of an exemplary ice detection test apparatus with a centrifugal fan.
Figure 2A:
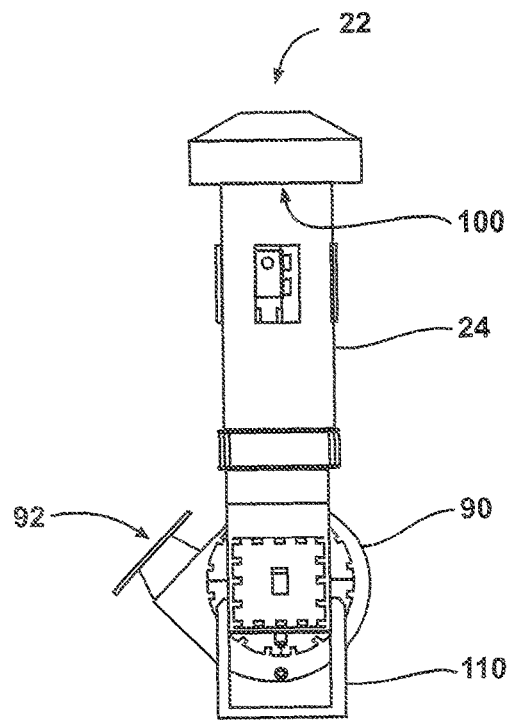
FIG. 2A is a side view of the ice detection test apparatus shown in FIG. 2.
Figure 2B:
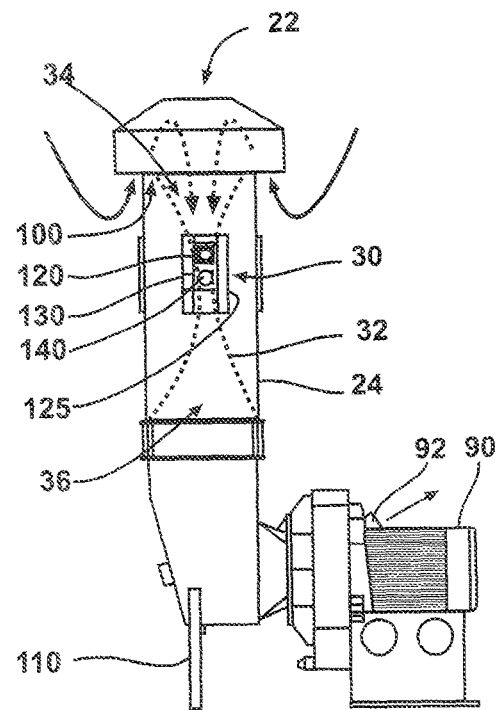
FIG. 2B is a side view of the ice detection test apparatus shown in FIG. 2.
Figure 2C:
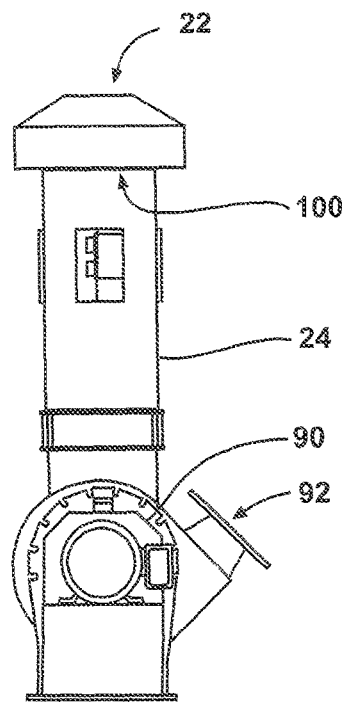
FIG. 2C is a side view of the ice detection test apparatus shown in FIG. 2.
Figure 2D:
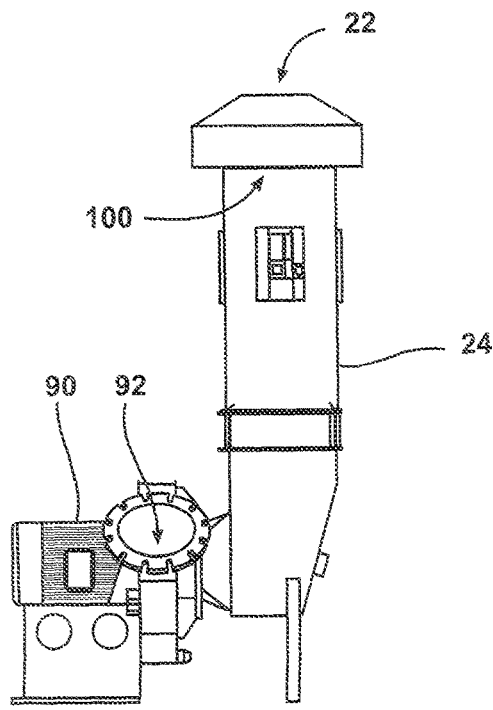
FIG. 2D is a side view of the ice detection test apparatus shown in FIG. 2.

In the embodiment shown in FIGS. 2 to 2D, the ice detection test apparatus 22 comprises a housing 24 with an air intake 100 and an optional stand 110. The housing 24 is an environmentally controlled enclosure that protects the electronics located inside. FIG. 2B shows the engine pressure simulation device 32 is located inside the housing 24. The engine pressure simulation device is configured for simulation conditions at the air intake of the jet engine being tested. The engine pressure simulation device can comprise any suitable type of device that is capable of simulating conditions at the air intake of the jet engine being tested when air is moved through the same. The engine pressure simulation device can comprise, among other things, a venturi tube, or a convergence-divergence (C-D) air duct structure. The air moving device 90 is connected to the engine pressure simulation device 32 for moving air through the engine pressure simulation device 32. Air is drawn in the air intake 100, through the engine pressure simulation device 32, and is then expelled out the exhaust opening 92 of the air moving device 90. The ice monitor sensor array (IMSA) 30 comprises a first sensor or first set of sensors (e.g., 120, 125, 130, and 140) that are positioned to measure air passing through the engine pressure simulation device 32.

Figure 2E:
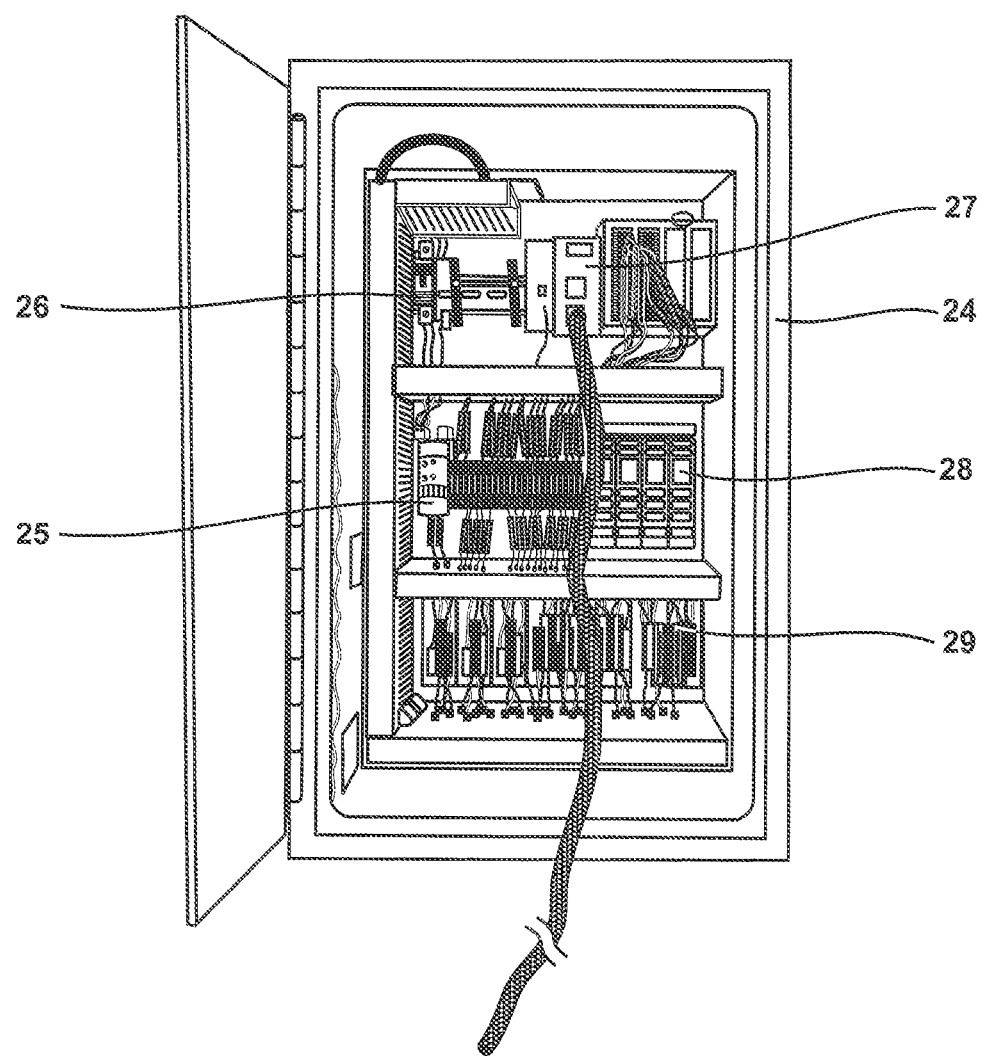
FIG. 2E is a perspective view of one embodiment of the interior of the housing of the ice detection test apparatus that shows the components therein.

FIG. 2E shows the components inside the housing 24 of the ice detection test apparatus 22. These include: a power supply 25, a breaker 26, a component 27 for communicating with a data acquisition unit (DAU) input/output, pressure sensor modules 28, and protective fuses 29.

Figure 3A:
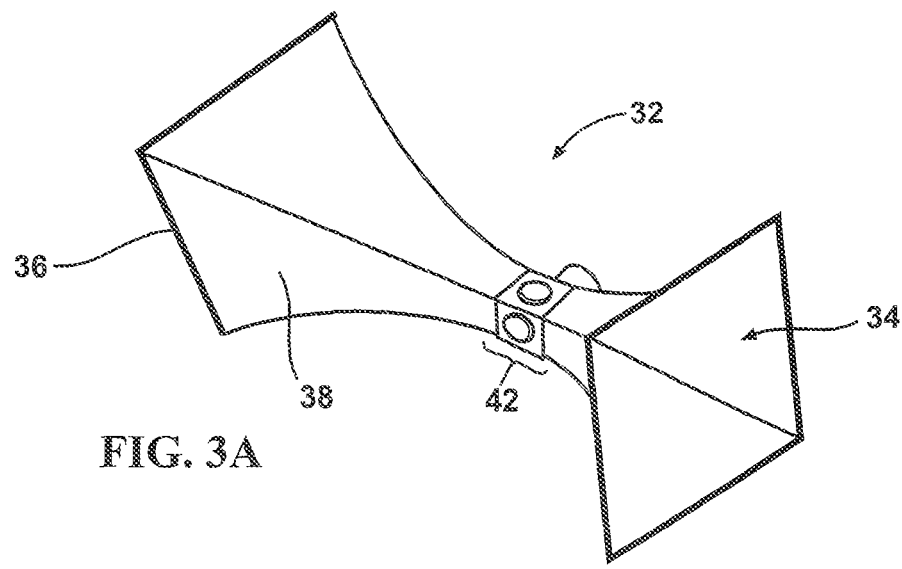
FIG. 3A is a perspective view of a convergent-divergent air duct structure within the ice detection test apparatus housing.
Figure 3B:
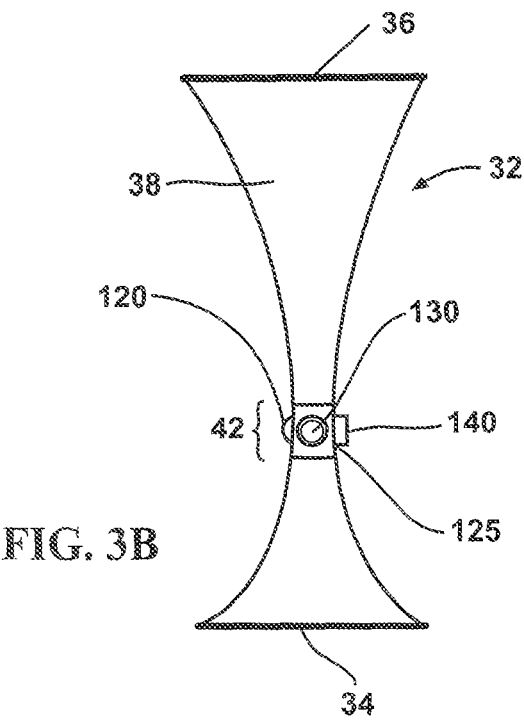
FIG. 3B is a side view of the convergent-divergent air duct structure shown in FIG. 3A (all four side views being the same).
Figure 3C:
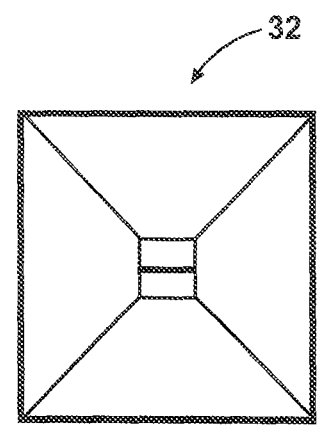
FIG. 3C is an end view of the convergent-divergent air duct structure shown in FIG. 3A.

FIGS. 3A-3C show an engine pressure simulation device in the form of a convergence-divergence (C-D) air duct structure 32 located within the test apparatus' housing 24. The C-D air duct structure 32 is provided to accelerate air within an airflow passing through the IMSA 30 to reproduce the pressure and temperature conditions that exist within or adjacent to the engine air intake, such as at bellmouth engine intake adapter 50 (or alternatively flight nacelle) that is coupled to the engine in the engine test cell during engine test cell operation. Although the C-D air duct structure 32 may be configured to simulate conditions at the air intake of the jet engine being tested, the C-D throat is roughly 60 times smaller than the engine intake, allowing a moderate size fan to simulate the airflow created by a turbine engine.

The C-D air duct structure 32 has a length and width, and comprises an inlet 34, an outlet 36, sides 38, and a throat (or "throat portion") 42 between the inlet and outlet where the sides narrow. The C-D air duct structure 32 shown in FIGS. 3A-3C has a configuration in which the sides 38 are curvilinear and concave. In this embodiment, the shape of the inlet 34 and outlet 36 openings, and the shape of the throat 42 are square. Other shapes including circular are possible. In this embodiment, the inlet 34 and outlet 36 openings are the same size. In other embodiments, the inlet and outlet openings may be such that one is larger than the other. The throat 42 may be located closer to the inlet 34 than the outlet 36 to provide more space for air leaving the throat 42 to expand. Less room is required to compress air than to expand air. The non-symmetrical position of the throat 42 allows a smaller fan 90 to be used than if the throat 42 were located the same distance from the inlet 34 and outlet 36.

The C-D air duct structure 32 can have any dimensions that are suitable for carrying out the purposes described herein. In one embodiment, the C-D air duct structure 32 has a length (in the direction of air flow) of 42 inches (about 107 cm), and a width at the inlet and outlet of 18 inches×18 inches (about 46×46 cm), or 324 $in^2$ (about 2,120 $cm^2$). The throat 42 has a length of 8 inches (about 20 cm) and a square cross-section measuring 4 inches×4 inches (about 10×10 cm), or 16 $in^2$ (about 100 $cm^2$). The dimensions of the C-D air duct structure can be varied to accommodate different engines being tested. For example, the inlet and outlet openings can range in size up to 30 inches×30 inches (about 76 cm×76 cm), or more, in which case, the dimensions of the throat can be increased accordingly. The area of the openings at the inlet 34 and outlet 36 can be any suitable multiple of the cross-sectional area of the throat 42. For example, the area of the inlet and outlet openings may be 2, 3, 4, and every integer thereafter up to 100, or more times the cross-sectional area of the throat 42. In the example above, the area of the openings at the inlet and outlet are about 20 times the cross-sectional area of throat 42.

The engine pressure simulation device, such as the C-D air duct structure 32 can produce any suitable pressure drop in the throat 42 for simulating the conditions at the engine air inlet. The engine pressure simulation device 32 can be configured to produce a pressure drop in any suitable range from greater than or equal to 0 psia to about 14 psia (about 96.5 kPa). In the embodiment described above, the C-D air duct structure 32 produces a pressure drop of about 1.5 psia (10.3 k Pa). In other exemplary embodiments, the pressure drop may be about 12 psia (82.7 k Pa).

Figure 4:
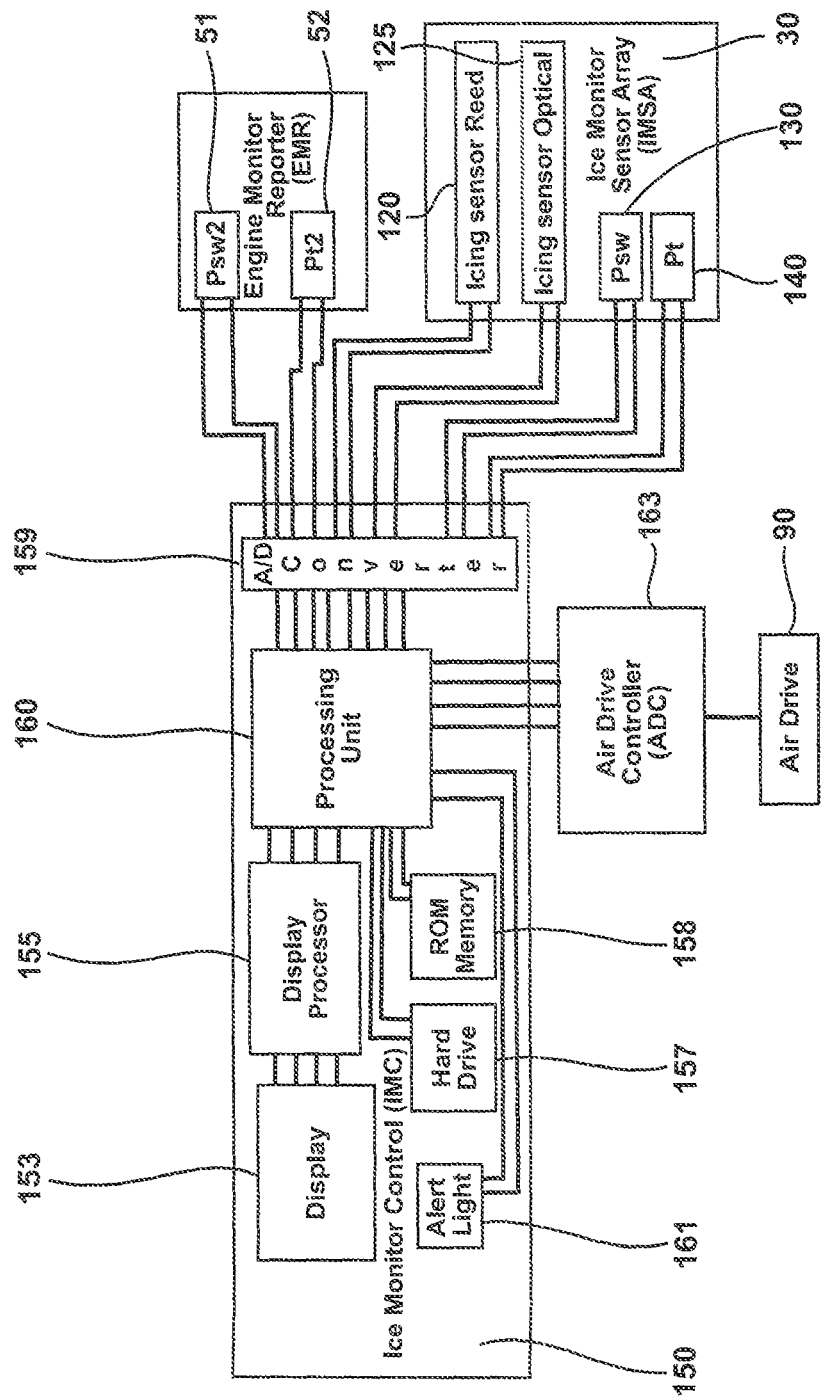
FIG. 4 is a simplified block diagram of various elements of one embodiment of the ice detection system.

The air-moving device 90 draws air from the test apparatus' intake 100 and pulls it across the IMSA sensor or sensors (such as 120, 125, 130, and 140) located in the engine pressure simulation device, such as in the throat 42 of the C-D structure 32. The air is then exhausted via a fan exhaust 92. The air-moving device 90 can comprise any suitable type of air moving device, including fans and blowers. In the embodiment shown, the air-moving device comprises a centrifugal fan that includes a motor. FIG. 4 shows that the air-moving device 90 may be operated by an air drive controller (ADC) 163 that communicates with a processing unit 160 that controls mass flow and air pressure pulled through the sensor array elements of the IMSA 30.

Figure 5:
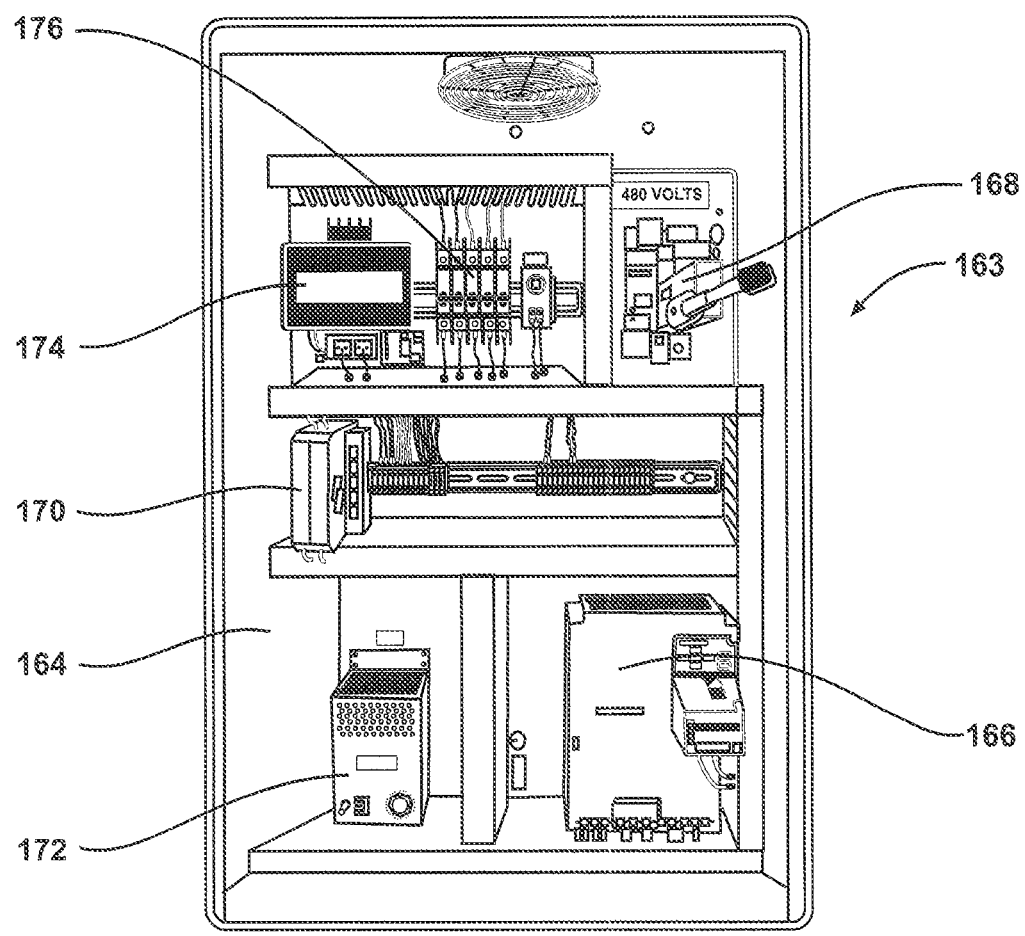
FIG. 5 is a perspective view of the interior of one embodiment of an air drive controller (ADC).

FIG. 5 shows the interior of the air drive controller (ADC) 163. The ADC 163 may be located near the ice detection test apparatus 22. The ADC 163 takes inputs from the ice monitor controller (IMC) 150 to control the air drive 90 to achieve the desired pressures inside the engine pressure simulation device 32 that contains the ice monitor sensor array 30. The ADC 163 may comprise a housing 164 in the form of an environmentally-controlled enclosure that houses a variable frequency drive (VFD) 166, an electrical switch gear 168, input/output (I/O) electronics 170, and a heater 172 to maintain warmer temperatures inside the enclosure. A transformer 174 and breakers 176 are also shown.

The air drive controller (ADC) 163 can control the output of the air moving device 90 so that the pressures at the engine pressure simulation device 32 approximate the pressures at the intake of a jet engine being tested. The term "approximate", as used in this context means that there is less than a +/−0.5 psi (about 3.5 KPa) difference between the pressures at the engine pressure simulation device 32 and the pressures at the intake of a jet engine being tested. In some cases, it is desirable that there be less than or equal to 0.2 psi (about 1.4 KPa) difference between the pressures at the engine pressure simulation device 32 and the pressures at the intake of a jet engine being tested. In the embodiment described herein, the goal is to match the pressures and maintain less than or equal to a 0.01 psi (about 0.7 KPa) difference between the pressures at the engine pressure simulation device 32 and the pressures at the intake of a jet engine being tested.

Figure 6:
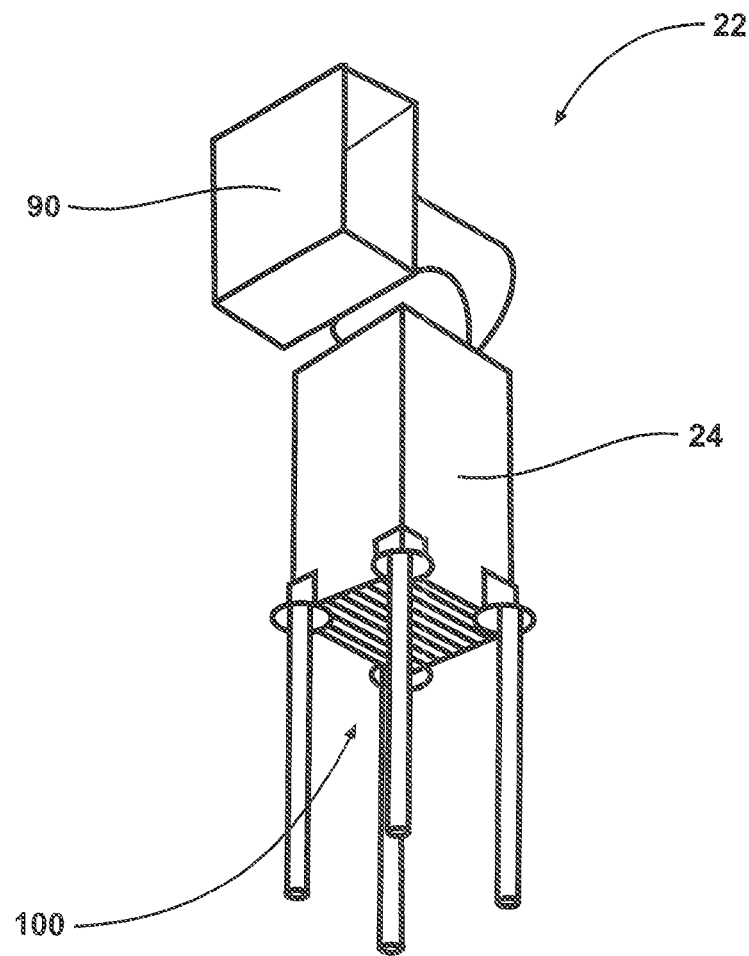
FIG. 6 is a perspective view of another embodiment of an ice detection test apparatus that is on a stand and has a centrifugal fan that is positioned above the housing containing a convergent-divergent air duct structure.

FIG. 6 shows an alternative ice detection test apparatus 22 in which the air moving device 90 is joined to the top of the housing 24 containing the engine pressure simulation device 32. In this embodiment, the housing 24 is supported by a stand 110 that is a sufficient distance from a surface (e.g., a roof section adjacent to inlet 18) to minimize the impact of the surface on the airflow entering the ice detection test apparatus 22. The stand 110 provides clearance from a supporting surface high enough to keep excess water vapor from being ingested from any standing water underneath the ice detection test apparatus 22. An embodiment of an ice detection test apparatus 22 can include a camera 151 installed on the stand that is positioned to observe the ice detection test apparatus 22 intake to determine if the intake is clear of obstructions before or during testing.

The ice monitor sensor array (IMSA) 30 comprises one or more sensors that are designed to measure airflow conditions in the engine pressure simulation device 32 and simultaneously scan for icing conditions. The ice monitor sensor array (IMSA) 30 is part of the ice detection test apparatus 22 that was referred to previously as an ice detection sensor array (IDSA). In the embodiment shown, the sensors are located in the throat 42 of the C-D structure. The ice monitor sensor array 30 sensors may include one or more of ice sensors, static pressure sensors, total pressure sensors, and temperature sensors. If there is only one sensor, it may be referred to as a first sensor. For example, the ice monitor sensor array 30 may comprise only a first static wall pressure sensor, and the sensor may be monitored for icing. If there is more than one sensor, the sensors may be referred to individually as first sensors, and collectively as a first set or plurality (or group) of sensors. In one embodiment, the ice monitor sensor array 30 may comprise a first set of sensors comprising at least a first static wall pressure sensor and a first ice sensor.

In another embodiment, as shown in the drawings, the first set of sensors comprises additional sensors. In this case, the first set of sensors comprise a primary icing sensor 120, an optional secondary icing sensor 125, a static wall pressure sensor Psw2 130, and an optional total pressure sensor Pt2 140. If desired, the letter "I" may optionally added to the end of these sensor designations (e.g., Psw2I and Pt2I) to make it clear that these are ice detection apparatus sensors. The location of the sensors is shown in FIG. 3B.

The sensors 120, 125, 130, and 140 can comprise any sensors that are suitable for the purposes described herein. The primary ice sensor 120 may be any suitable type of ice detection sensor including, but not limited to mechanical, optical, capacitive, resistance, electric heater, visual, vibration, laser, and guided wave. The primary ice sensor 120 may, for example, be a mechanical sensor, such as a reed type sensor. One exemplary primary ice sensor 120 is United Technology Corporation (UTC) Aerospace Systems 0871LH1 freezing rain sensor 120 obtained from Campbell Scientific (Canada) Corp., Edmonton AB, Canada, or Collins Aerospace, Charlotte, N.C., U.S.A. This ice sensor 120 can detect icing conditions as thin as 0.001 inch (about 0.25 mm) of ice accumulation. The primary ice sensor 120 can be provided with a cylinder that protrudes into the air flow, or it can be provided with an airfoil that creates lift to further reduce the temperature in the measured air flow. If the primary ice sensor has an airfoil, the angle of attack may be adjustable to fine-tune air flow temperature to match the engine's air flow intake temperatures. Ice sensor 120 can be equipped with a heating element so that accumulated ice can be melted off and allowed to re-ice to determine icing severity.

The optional secondary ice sensor 125 can be any suitable type of ice detection sensor such as those described above. In one embodiment, the secondary ice sensor 125 may be an optical sensor. One exemplary secondary ice sensor 125 is Ice*Meister Model 9732-STEEL™ ice detecting sensor for aircraft available from New Avionics Corp., Ft. Lauderdale, Fla. The secondary ice sensor 125 may be located on the opposing side of the engine pressure simulation device 32 relative to the side 38 shown in FIG. 3B.

FIGS. 7A-7C show different views of an exemplary Psw static wall air pressure sensor 130 (formerly designated Ps2I). The Psw sensor 130 has two functions comprising a first function that is used to set a pressure in the engine pressure simulation device 32 of the ice detection test apparatus 22 to match jet engine intake conditions. A second function is to provide a secondary method to detect ice formation. The processing unit 160 may monitor for ice formation and may send an alert signal once the processing unit has determined that ice accumulation is severe enough to halt testing. This Psw 130 probe can be selectively heated by an ice melting mechanism to melt any ice formed and allow re-formation of ice to evaluate or determine icing speed or ice damage event potential or severity. While the static wall air pressure probe 130 may be similar to conventional static air pressure probes, it has been custom fabricated to provide it with dimensions that are suitable for use in the ice detection test apparatus 22.

This static wall air pressure sensor 130 is a single piece that comprises two circular disk-shaped portions that are concentrically aligned and have a central hole or passageway passing through the center thereof. The upper disk-shaped portion has a diameter of 1.625 inches (about 4.13 cm) and a thickness of 0.125 inch (3.18 mm). The lower disk-shaped portion has a diameter of 1 inch (2.54 cm) and a thickness of 0.25 inch (about 6.4 mm), for a combined thickness of 0.375 inch (about 9.5 mm). The sensor can be made of any suitable material. In one embodiment, the sensor is made of 304 stainless steel. The central passageway is defined by a first bore and a second bore. The first bore has a 2 mm diameter and extends from the top surface of the sensor 0.125 inch (3.18 mm) into the thickness of the sensor. The second bore has a 1 mm diameter and extends the rest of the way through the sensor to the bottom surface of the sensor. A wire may extend from the bottom opening of the second bore to a transducer. The sensor has four additional spaced apart through-holes disposed adjacent to the circumference of the upper disk-shaped portion. The additional through-holes are used for securing the sensor to a surface with screws.

The Pt sensor 140 can be any suitable type of air pressure sensor that measures total air pressure in the engine pressure simulation device 32 of the ice detection test apparatus 22. The Pt sensor 140 can also have a built in temperature probe or thermocouple so it can enable measurement of temperature in addition to total air pressure. The Pt sensor 140 can be used to ensure the engine and the engine pressure simulation device 32 are operating in similar conditions and if they are not, it will be used to adjust the air flow through the engine pressure simulation device 32 to match or approximate the engine intake 50 temperature and pressure conditions. The Pt sensor's 140 other function is ice detection. In this embodiment, the Pt sensor 140 can be less likely to have ice formed thereon than the Psw sensor 130, so the Psw sensor 130 can be used by the processing unit 160 to determine when the Pt sensor 140 is indicating ice. In an alternative embodiment, a resistance temperature detector (or RTD) can be used instead of a thermocouple. In one embodiment, the Pt sensor 140 can be a heated pitot-static strut probe supplied by Aeroprobe Corporation of Christiansburg, Va., U.S.A.

The engine is generally equipped with one or more sensors or probes that are positioned proximate to a jet engine air intake to measure air passing into the jet engine intake. The jet engine sensors may be referred to as a second sensor (if only one), or as a second set, plurality (or group) of sensors, if more than one. Typically, jet engines are equipped with at least an engine bellmouth static wall pressure sensor. In the case of engines that do not have an engine bellmouth static wall pressure sensor, other measurements (such as N1 RPM speed) can be taken and the air flow going into the engine can be calculated. The N1 RPM speed is a direct measurement of the RPM of the fan which is displayed as a percentage of the set value for the "maximum" RPM. The engine sensors will not be considered to be part of the test apparatus or system unless specifically included in the body of one or more of the appended claims (as opposed to the preamble). The engine sensors will, however, feed measurements taken from the engine into the system.

In one embodiment, the second group of sensors comprise a pair of sensors that are designated pressure static wall engine station 2 engine (Psw2) sensor 51 and pressure total station 2 engine (Pt2) sensor 52. The reference "station two" is a reference to a location associated with a given jet engine. A jet engine generally has seven stations from its forward to aft end. The meaning of station references one, two, etc. as used with, e.g., Psw2 51, are well known in the art of engines and engine test cells as they provide a fixed reference framework as to specific locations in relation to a jet engine system. Thus, the use of s2 in Psw2 explains where the Psw2 sensor 51 is physically located in relation to the jet engine in question. This second plurality of sensors may, for example, be proximate to (e.g., joined to) the jet engine intake protective structure 50 or a flight cowling coupled to an intake section of the jet engine. If desired, the letter "E" may optionally added to the end of these sensor designations (e.g., Pt2E and Psw2E) to make it clear that these are engine test sensors.

The static wall air pressure probe Psw2 51 may be the same type of sensor as the Psw static air pressure sensor 130 described above and may be positioned or located in the bellmouth of the engine under test. The Pt2 probe 52 may be the same or similar type of probe as the Pt probe 140 described above and is positioned in the bellmouth or flight inlet of the engine under test in the test cell. The engine sensors and related systems and instruments feed data/measurements into an engine test data acquisition system (see FIG. 4) to provide information about the engine under test during a test. The data acquisition system is computer software that is typically present on the processor used in a test cell that is used to drive the engine. There is typically a different module to run each type of engine to be tested.

Figure 8:
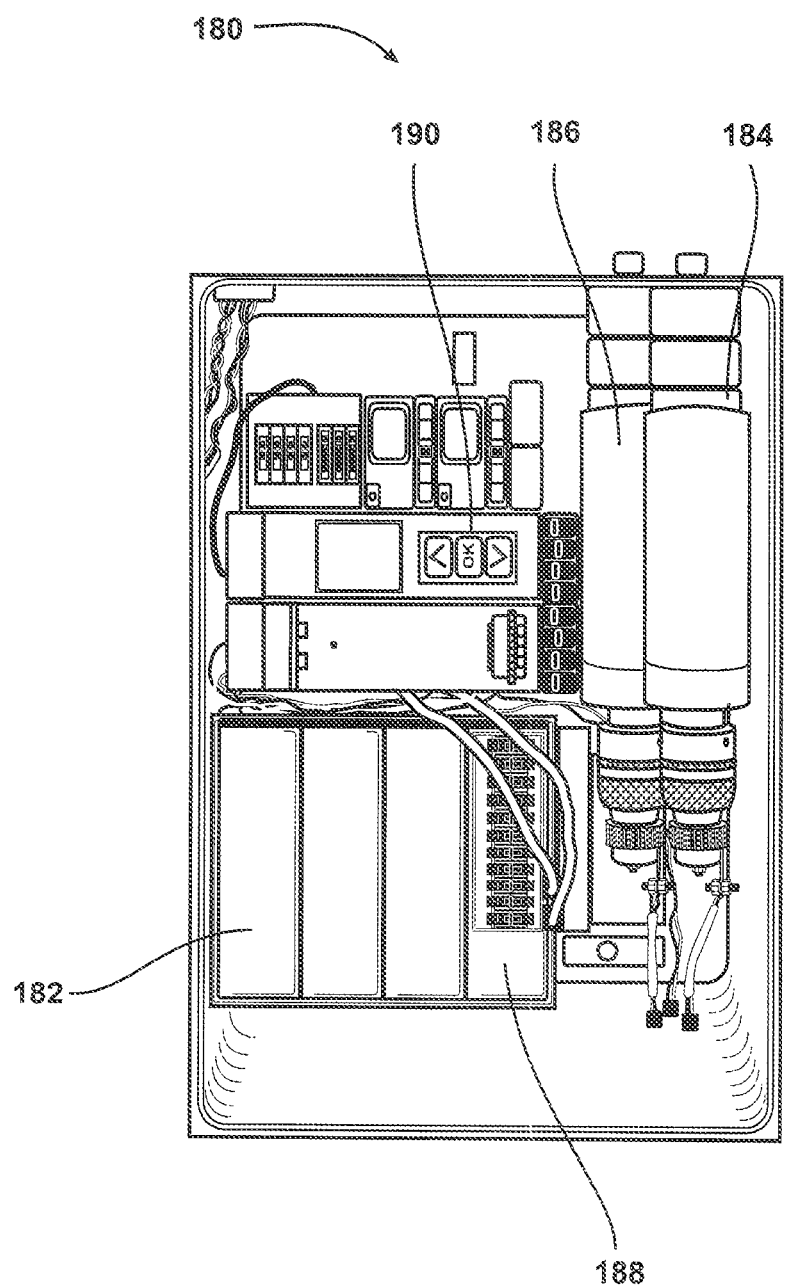
FIG. 8 is a perspective view of the interior of the engine monitoring reporter (EMR).

FIG. 8 shows one embodiment of an engine monitoring reporter (EMR) 180 that may house transducers that are connected to the sensors Psw2 51 and Pt2 52. In this embodiment, the EMR is located on the engine adapter 61. The sensors measure the pressures using the engine's static wall sensor Psw2 51 and pitot tube sensor Pt2 52. The pressures measured are $P_{staticwall}$ and $P_{total}$. A Psw transducer 184 and a Pt transducer 186 are shown along with an analog input module 188, and signal conditions module 190. The transducers convert the pressures to voltage. Any suitable transducers can be used including, but not limited to Model Super TJE ultra precision pressure transducer manufactured by Honeywell International, Inc. The EMR continuously sends data to the ice monitor controller 160 and is used to match inlet conditions within the engine pressure simulation device 32.

FIG. 4 is a simplified block diagram showing the connections between the various elements of one embodiment of the ice detection system. The first group of sensors (which in this case comprise primary icing sensor 120, an optional secondary icing sensor 125, a static wall sensor Psw2 130, and a total pressure sensor Pt2 140) in the IMSA 30 measure conditions at the engine pressure simulation device 32, and output their signal measurements to an analog to digital (A2D) converter 159. The second group of sensors (Psw2 51 and Pt2 52) are used to measure conditions at the inlet of the engine under test and output their measurements through the EMR to the A2D converter 159. The A2D converter 159 outputs the converted measurement signals to the processing unit 160 of an ice monitor control 150.

FIG. 4 shows a schematic representation of the ice monitor control (IMC) 150. The IMC 150 was previously referred to as an ice detection, warning, and control system or section (IDWC). The IMC can be in any suitable location. If the ice detection system is used in a jet engine test cell, the IMC 150 may be located in the control room 60 of the jet engine test cell 10. The ice monitor control (IMC) 150 may comprise: a machine instruction processor such as processing unit 160; a video card; a display 153; a display processor 155; a storage medium coupled with the machine instruction processor that stores machine readable instructions, such as hard drive 157; memory coupled with the machine instruction processor (e.g., RAM or ROM memory 158); the A/D converter 159; and an alert light 161.

The IMC 150 may function to: (1) attempt to match (that is, approximate) the conditions inside the ice monitor sensor array 30 to the engine's intake; (2) check for ice using the one or more of the methods described herein; and (3) warn the engine operator of icing conditions. The IMC 150 receives EMR and IMSA pressures and uses internal logic to make continuous changes to the ADC 163 so that similarity is constantly being sought between the pressure inputs. Concurrently, the IMC 150 is monitoring the primary ice sensor, secondary ice sensor, and both $P_{staticwall}$ sensors for ice indication and may trigger an alert when an indication is detected. A positive result may initiate a user selected audible alarm, visible flashing, or both. The IMC 150 is also continuously monitoring status of all the sensors, pressure transducers and engine speed measuring devices and will signal a failure notifying the user the system is no longer working as intended. Various alternative embodiments can use substitute elements for the processor such as a programmable logic unit, field programmable gate unit (FPGA), application specific integrated circuit, etc. to execute machine instructions or operations/control actions such as those described in further detail below.

The processing unit 160 comprises a component of the ice monitor control ("IMC") 150. The A2D converter 159 outputs converted measurement signals to the processing unit 160 for analysis and processing. FIG. 4 shows that the processing unit 160 controls the air drive controller (ADC) 163 which operates the air moving device such as a fan or blower 90 that is connected to the engine pressure simulation device 32 for moving air through the engine pressure simulation device 32. The processing unit 160 operates in coordination with an input/output unit (such as a keyboard or touch screen, conventional and not shown), the hard drive 157, and the memory (e.g., RAM or ROM memory 158). The processing unit 160 may execute machine instructions stored in the hard drive to carry out process steps such as those described in further detail below.

Figure 10A:
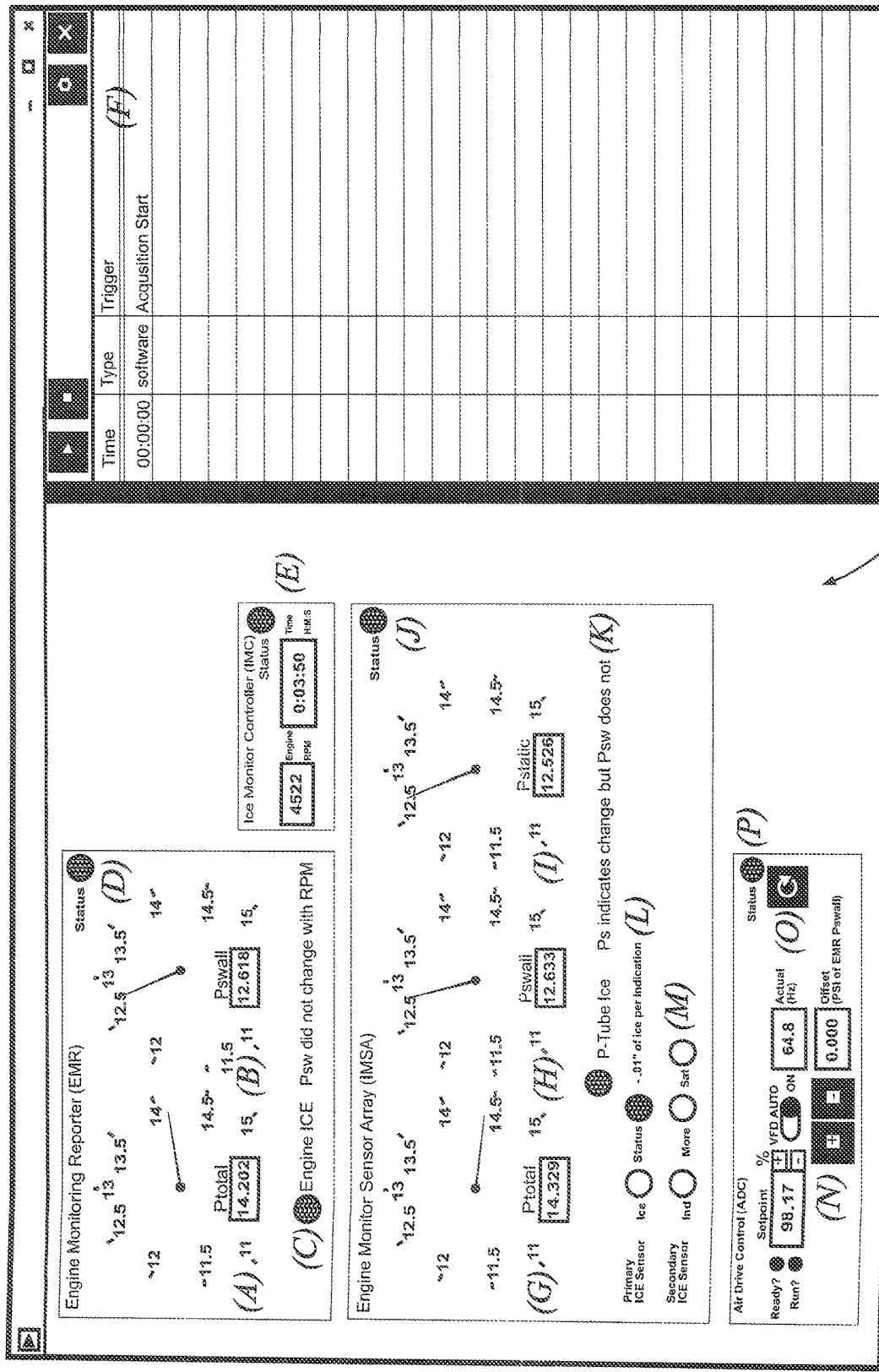
FIG. 10A shows an exemplary user interface (UX) or human machine interface (HMI) shown on a display.
Figure 10B:
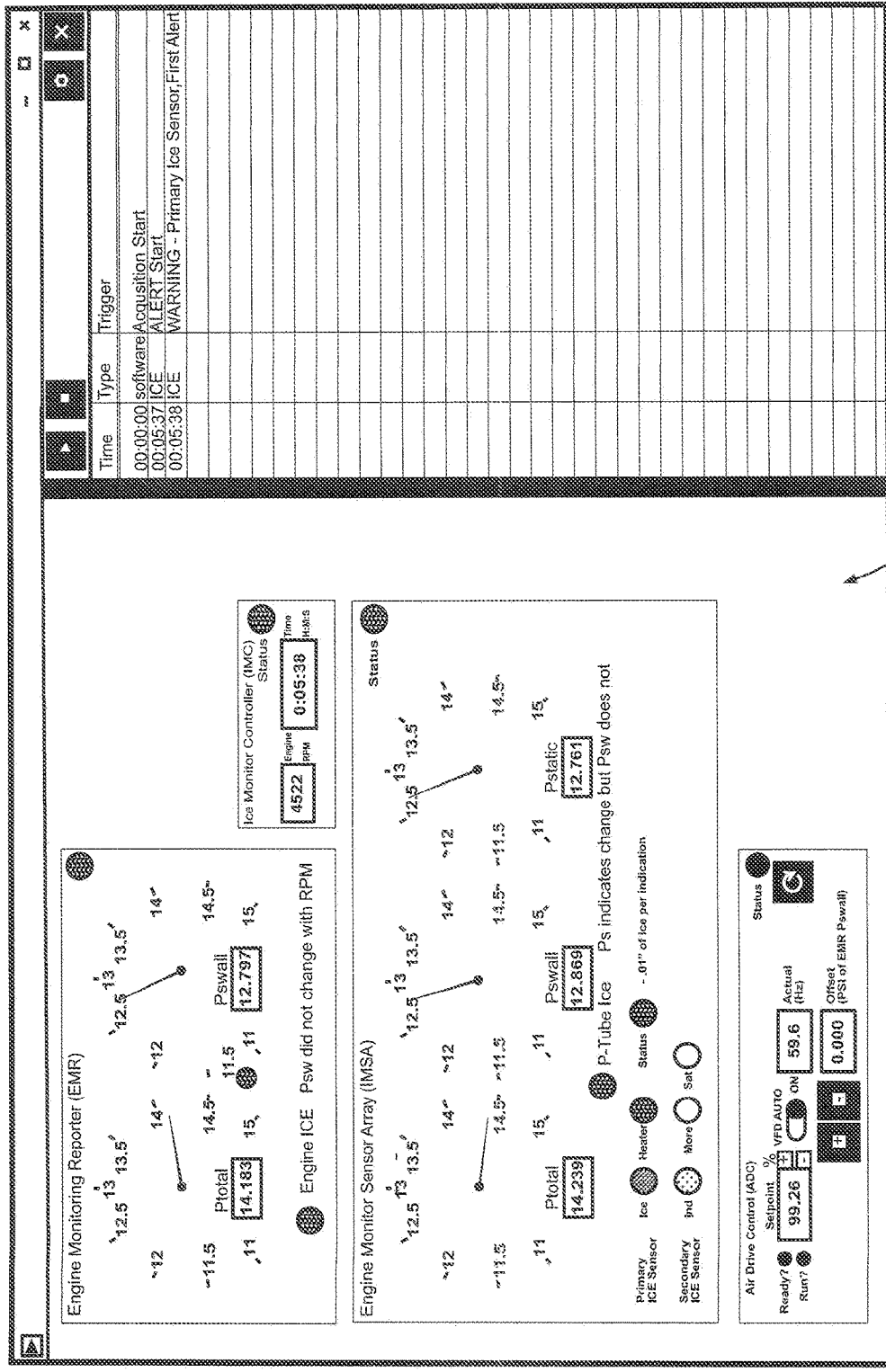
FIG. 10B shows an exemplary user interface (UX) or human machine interface (HMI) shown on a display showing an alert for the secondary ice sensor and a warning for the primary ice sensor.

The processing unit 160 may also generate various graphical user interface (GUIs) or user experiences (UX) on display 153 in response to machine instructions and user interactions. Examples of a GUI or human machine interface (HMI) are shown in FIGS. 10A and 10B. FIG. 4 shows that an icing alert light 161 can also be activated in a field of view of an engine test cell operator to warn of an undesirable icing condition or imminent icing condition.

The machine readable instructions executed by the processing unit 160 may comprise: a first plurality of machine readable instructions comprising configuration and setup instructions; a second plurality of machine instructions comprising manual mode instructions; a third plurality of machine readable instructions comprising semi-manual mode instructions; and a fourth plurality of machine readable instructions comprising automatic mode instructions.

The first plurality of machine readable instructions enable the operator to input configuration information into one or more configuration or setup graphical user interfaces displayed on the display 153. The configuration information may include a selection of manual mode, semi-manual mode, or automatic mode. The configuration information may further comprise pressure data and jet engine rotations per minute data.

The second, third, and fourth machine readable instructions perform comparisons of inputs from the first and second plurality of sensors against each other and stored temperature and pressure values to determine if icing conditions are imminent or exist at the jet engine intake or when ice begins to form on the ice sensor(s). The second, third, and fourth plurality of machine readable instructions may further generate icing condition warning graphics on the display 153 to warn an operator of the icing conditions and type of icing conditions. The semi-manual mode instructions and the automatic instructions may activate one or more heating elements when icing conditions exist or ice forms on the ice detector(s).

More specifically, in some embodiments, the first plurality of machine instructions may comprise a plurality of configuration instructions to operate the processor to generate a first plurality of graphical user interfaces (GUI) comprising startup or configuration GUI elements. These GUI elements may comprise: a first configuration GUI that displays prompts for an operator to determine if the engine test can proceed with all revolutions per minute (RPM) within the engine's operating range in an automated incremental testing process, or whether the engine test may proceed with a specified set of RPM ranges. In the latter case, the first configuration GUI section prompts the operator to input desired RPM values and pressure values associated with each RPM value. The startup GUI elements may further comprise a second configuration GUI that prompts the operator to select one of a plurality of test operating modes comprising manual, semi-automatic, or automatic.

The second plurality of machine instructions may comprise manual mode machine instructions that operate the processor to perform continuous monitoring operations utilizing the ice sensor and first pressure sensor data inputs. The second plurality of machine instructions may further operate the processor to generate an alert on the display or alert system to alert the operator of ice build-up in the engine intake test area. The second plurality of machine instructions may provide an operator with an option to enable the operator to melt off built up ice from one or more sensors and continue testing.

The third plurality of machine instructions comprise semi-manual mode machine instructions that operate the processor to perform continuous monitoring operations that the manual mode machine instructions execute. The third plurality of machine instructions may perform alerting operations for the operator of ice build-up as well as automatic ice melting on at least one of the sensors while enabling continuous engine operation. If multiple ice detections are determined by the third plurality of machine instructions outside a predetermined time interval, the third plurality of machine instructions will operate the processor to automatically melt ice on at least one sensor and generate a GUI warning and prompt to the operator to decide if they intend to continue to run or terminate the engine run. The third plurality of machine instructions may further comprise instructions to determine if ice is detected within the predetermined time interval after a previous positive ice indication and operator warning. If this occurs, then the third plurality of machine instructions will operate the processing section to generate a GUI warning screen to direct the operator to drive the engine throttle to idle and start shutdown procedures.

The fourth plurality of machine instructions comprise an automatic mode processing instruction module adapted to perform continuous monitoring that either manual or semi-automatic modes perform and selectively alert the operator of ice build-up. The fourth plurality of machine instructions will automatically melt ice on at least one sensor and advise the operator of the initial detection and melting operation if the fourth plurality of machine instructions determines multiple ice detections have occurred within a predetermined time interval. If the fourth plurality of machine instructions determines occurrence of additional ice detections within a selected time frame from a previous multiple positive ice indication, then the fourth plurality of machine instructions may operate the processor to generate another warning GUI on the display to warn of severe icing detection, and display a warning suggesting the operator drive the engine throttle to idle operation, and prominently display an operator instruction/direction to the operator to proceed with an emergency engine shutdown.

The machine instructions may further comprise a fifth plurality of machine instructions comprising a sensor monitoring and data acquisition unit. Once one of the plurality of modes is selected by an operator, the fifth plurality of machine instructions will operate the processor to start icing data detection by monitoring the first and second plurality of sensors to determine if icing will start accumulating inside the engine inlet. The fifth plurality of machine instructions may further comprise IMSA condition adjustment machine instructions that compares sensor data from the first static pressure sensor 130 with the second static pressure sensor Psw2 51. If the first and second pressure sensor are substantially equal, then the IMSA condition adjustment machine instructions will continue comparing the first and second static pressure sensor data. If the first static pressure sensor data is greater than the second static pressure sensor data, the IMSA condition adjustment machine instructions will operate the processors to increase power to the air blower section to increase airflow within the engine pressure simulation device 32. If the first static pressure sensor data is less than the second static pressure sensor data, IMSA condition adjustment machine instructions operate the processor section to decrease power to the air blower section to decrease airflow within the engine pressure simulation device 32.

The fifth plurality of machine instructions may also comprise ice detection machine instructions to operate the processor to constantly send a predetermined voltage to the ice sensor and monitor the return voltage within the ice sensor circuit. If the ice detector sensor monitoring machine instructions operating the processing section does not detect a positive range voltage (1.7V) in the ice detector, then the ice detector sensor monitoring machine instructions will continue to monitor the ice sensor for a positive detection range voltage. If the ice detector sensor monitoring machine instructions operating the processor detects a positive range voltage, the ice detector sensor monitoring machine instructions set a flag or store a positive detection for ice and record this ice detection event and a time it occurred in the storage medium. If a positive range voltage has not been previously detected within a predetermined time interval, then the ice detector sensor monitoring machine instructions will operate the processor to send a voltage or signal to the ice sensor that will activate a heating element in the ice sensor and melt ice off ice sensor. If the 1.7 V detection event has been detected within the predetermined time interval, then the ice detector sensor monitoring machine instructions will operate the processing section to generate a warning GUI on the display to warn the operator that severe ice formation has been detected.

A sixth plurality of machine instructions may be provided that comprises secondary icing detection and mitigation process machine instruction section. A temperature sensor can be provided in the IMSA to monitor for icing conditions, to be compared with the inlet temperature conditions if the engine is equipped with an inlet temperature sensor. The sixth plurality of machine instructions may operate the processor to monitor a first temperature sensor located in the IMSA for variations greater or less than a predetermined first and second temperature sensor signal fluctuation value wherein temperature fluctuations greater or less than the first or second temperature value are associated with icing or no icing conditions.

A seventh plurality of machine readable instructions may be provided that comprise a static pressure icing detection module. When the seventh plurality of machine readable instructions determine that the first static pressure sensor signals are not fluctuating more than a predetermined static pressure fluctuation value, then ice has been detected and, in semi-manual or automatic mode, the seventh plurality of machine instructions will alert the operator of ice formation.

Figure 9:
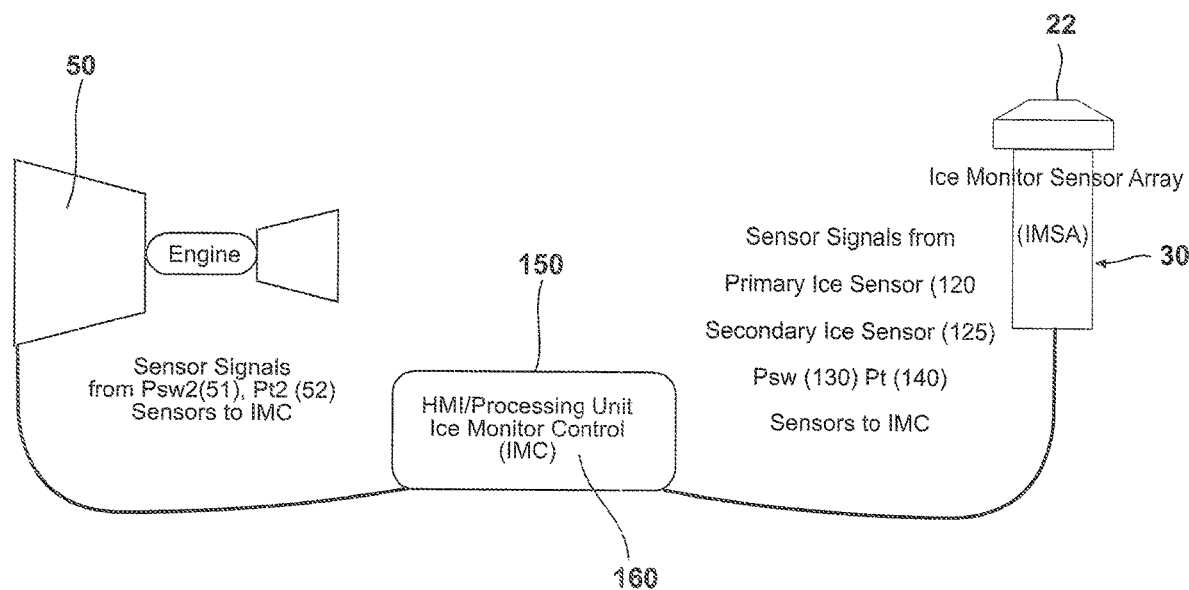
FIG. 9 is a simplified functional block diagram showing the signals/signal connections between the engine, the HMI/processing unit, and the sensor array.

FIG. 9 is a simplified functional block diagram that shows the signal/bus connections between sensors positioned in relation to an engine under test, a human machine interface (HMI)/GUI shown on a display 153 associated with the processing unit 160, and IMSA 30 with its various sensors. The engine area sensors (such as Psw2 51 and Pt2 52) monitor conditions in the engine's inlet area during an engine test. The output of sensors 51 and 52 is sent to the processing unit 160 to be compared to the IMSA 30 sensors, such as a primary ice detection sensor 120, secondary ice sensor 125, Psw2 sensor 130, Pt2 sensor 140 outputs using processing steps such as those described below.

FIGS. 10A and 10B show an exemplary user interfaces (UX) or human machine interfaces (HMI) shown on display 153. Exemplary UX or graphical user interfaces (GUIs) can include windows, icons, menus, user selectable graphical control elements (e.g., action buttons), text input fields, and a pointer that enables a user to input configuration information, etc. This UX or HMI can include additional UXs or HMIs that a user can input engine type, set-up, calibration, and information displays showing information including icing conditions during test.

More specifically, in FIG. 10A reference letter (A) shows input from the EMR, utilizing the pitot tube in engine bellmouth—Pressure Ptotal (Pt). Both digital and analog displays are provided. Units are psia. At (B), the HMI shows input from the EMR, utilizing the pitot tube in engine bellmouth—Pressure $P_{staticwall}$ (Psw) providing digital and analog displays—units psia. At (C), the HMI shows the status of engine bellmouth ice indication utilizing the $P_{staticwall}$ bellmouth sensor. A green light indicates no ice is detected, and a red light and audible alarm indicates ice detected. At (D) the HMI shows the status of the EMR. A green light indicates it is performing correctly, yellow indicates an issue with performance has been detected. At (E) the HMI shows the status of the IMC. A green light indicates that the IMC is performing correctly, yellow indicates an issue with performance has been detected. Engine RPM is given along with a time stamp. At (F) the HMI provides a ledger area that lists alerts, ice indications and faults. Information about the system including alerts or failed systems can be found in this area. At (G) the HMI shows the input from IMSA, utilizing onboard pitot tube—Pressure $P_{total}$ (Pt) providing digital and analog displays—units psia. At (H) the HMI shows the input from IMSA, utilizing onboard port—Pressure $P_{staticwall}$ (Psw) providing digital and analog displays—units psia. At (I) the HMI shows the input from IMSA, utilizing onboard pitot tube—Pressure $P_{static}$ providing digital and analog displays —units psia. At (J) the HMI shows the status of the IMSA. A green light indicates it is performing correctly, yellow indicates an issue with performance has been detected. At (K) the HMI shows the ice indication utilizing the $P_{staticwall}$ onboard sensor. A green light indicates no ice is detected, a red light and audible alarm indicates ice is detected. At (L) the HMI shows the primary Ice sensor Alert. Ice indication will turn red with an audible alarm. The sensor status indication of green indicates that the primary ice sensor is operational, yellow indicates that the sensor has failed. At (M) the HMI shows the secondary Ice sensor Alert. The "Ind" alert indicates ice has been detected. The "More" alert indicates moderate ice has been detected. The "Sat" alert indicates heavy ice which has reached the maximum thickness where it has moved outside its ability to quantify any additional ice accumulation. All indications are accompanied with an audible alert. At (N) the HMI shows the Variable frequency Drive (VFD) setting allow for automatic mode, matching the EMR pressures. At (O) the HMI shows the shows the actual Hertz output of the VFD. The offset allows the system to manual inputting percent of EMR values, so the user can choose to be conservative or less conservative based on the EMR inputs. Making the ice prediction conservative based on the user desire. At (P) the status of the ADC system is shown. A green light indicates that the status is good, and a yellow light indicates an issue has been detected.

The method of ice detection on a turbine engine, in one embodiment, comprises the steps of:

a) providing a turbine engine test system comprising a turbine engine test apparatus that simulates the conditions at the air intake of the turbine engine and comprises a first air pressure sensor, and positioning the test apparatus in a location that is spaced away from the turbine engine and is in the presence of air that is representative of the air that will be drawn into the intake of the turbine engine;

b) running a turbine engine so that air moves through its air intake, and receiving information on the air pressure at the air intake;

c) moving air through the turbine engine test apparatus to produce an air pressure in the test apparatus that approximates the air pressure at the air intake of the turbine engine; and d) determining whether icing conditions are developing in the test apparatus, and comparing inputs from the first air pressure sensor and the information on the air pressure at the air intake of the turbine engine against each other and stored values to determine whether actual icing conditions exist on the turbine engine intake.

The following describes one example, in detail, of a method of operation associated with an embodiment of the invention used during an engine test in a test cell. All of the detailed steps described herein are not necessarily required. In addition, it should be understood that in the steps described below, and in the following Examples, that the voltages specified may be different if different brands or types of sensors are used. The method is, therefore, not limited to using the voltages described herein. Further, it is within the scope of the present system and method to use other measurable electrical changes (e.g., capacitance and/or resistance) in addition to, or as an alternative to measuring voltages.

Step 201. Install engine into an engine test adapter 61.

Step 203. Connect test hardware and associated probes 51 and 52 to the engine.

Step 205. Install engine/test adapter into a thrust frame 62.

Step 207. Service engine oil and any other tasks required for operating the engine during testing.

Step 209. Close test cell and proceed to control room.

Step 211. Start the Data Acquisition Unit (DAU), and load software used to test the subject engine.

Step 213. Power on an exemplary embodiment's HMI UX (IMC) (FIG. 4, 150) with its computer display.

Step 215. Select the Engine type on the HMI UX (IMC) drop down menu with setup and calibration options.

Step 219. Once all necessary steps for starting the engine are complete, start the engine.

Step 221. After necessary warm-up period is over and the engine checks are complete, the Ice Detection Unit IMSA (30) is ready for operation. The unit will notify the operator if calibration has expired. If required proceed to step 221.1, if calibration is current, go to step 222.

Step 221.1. The processing unit (160) of the (IMC) has an internal calendar that Precision Measurement Equipment Laboratory (PMEL) sets the interval for calibration of the unit's probes. If it is the first start-up or the time interval is met for recalibration, the HMI UX IMC will alert the operator that a calibration is required.

Step 221.1.1. Press button labeled pressure synchronize calibration on the HMI UX IMC of the exemplary embodiment.

Step 221.1.2. HMI UX displays a prompt asking the operator if the engine can proceed to all RPM's within the engine's operating range.

Step 221.1.2.1. If yes, the exemplary HMI UX will direct the operator to five different stabilized N1 RPM's. At each RPM the operator will be directed to input the DAU displayed pressures Psw2 (51) and Pt2 (52) into the HMI UX for pressure synchronizing the DAU and the exemplary embodiment's pressure transducers.

Step 221.1.2.2 If No, the HMI UX initially directs the operator to input idle pressure values (e.g., inches of water) associated with the Psw2 (51) sensor pressure value from the DAU and the Pt2 (52) sensor pressure value from the DAU (e.g., both displayed on separate display system) into the HMI UX at engine idle RPM setting. The exemplary HMI will ask the operator to perform the next set of pressure inputs associated with Psw2 (51) and Pt2 (52) when the engine is able to operate at the next n1 speed (e.g., 25 percent maximum RPM). Operator will continue to select a next RPM setting then input the two input pressure values until all sets of pressure values at the five RPM settings are input into the HMI UX.

Step 222. The HMI UX will ask the operator what mode that they want to operate the test.

Step 222.1. Manual Mode will perform continuous monitoring operations utilizing the primary ice detector (120), the secondary ice detector (optical) (125) and Psw (130) sensor and will alert the operator of ice build-up in the engine intake test area (50). Manual mode processing includes an option to enable the operator to melt off built up ice from the exemplary embodiment's probes and continue testing. However, manual mode will not keep track of how quickly ice is forming or rate of ice accretion. Manual mode comprises alerts for when ice is detected. Manual mode requires operator to activate ice-melting operations. Various tasks require operator activation.

Step 222.2 Semi-Manual mode will perform continuous monitoring operations that manual mode executes and perform alerting operations for the operator of ice build-up as well as automatic ice melting while enabling continuous engine operation. If multiple ice detections occurs outside a predetermined time interval, the processing unit (160) will automatically melt the ice and advise the operator to decide if they intend to continue to run or terminate the engine run. If ice is detected within the predetermined time interval after a previous positive ice indication and operator warning, the processing unit (160) will direct the operator to drive the engine throttle to idle and start shutdown procedures.

Step 223.3 Automatic mode will perform continuous monitoring that either manual or semi-automatic modes perform and can alert the operator of ice build-up. If multiple ice detections occurs outside a predetermined time interval, the processing unit (160) will automatically melt the ice and advise the operator of the initial detection and melting operation. If multiple ice detections occurs within a predetermined time interval, the processing unit (160) will automatically melt the ice without asking the operator for an operator input and thereby allowing continued testing. If additional ice detections are detected within a selected time frame (e.g., five minutes) of a previous multiple positive ice indication, the processing unit (160) will warn of severe icing detection, display a warning suggesting the operator drive the engine throttle to idle operation, and prominently display an operator instruction/direction to the operator to proceed with an emergency engine shutdown.

Step 224. Once a mode (e.g., discussed above) is selected, the processing unit (160) will start icing detection by driving the IMSA to engine inlet conditions. The processing unit (160) will initially execute steps 224.1 and 224.2 concurrently and then loop 224.1 steps while continuing with processing after 224.2 after step 224.2 is completed.

Step 224.1 Input Psw (130) voltage is compared to Input Psw2 (51) Voltage. If the voltages are substantially equal, return to step 224.1.

Step 224.1.1. If Psw (130) voltage is greater than Psw2 (51) the processing unit will increase voltage output to the ADC (163) to increase airflow through the engine pressure simulation device (32).

Step 224.1.2. If Psw (130) voltage is less than Psw2 (51) voltage, the processing unit will decrease voltage output to the ADC to decrease airflow in the device (32).

Step 224.1.3. Continue by returning to step 224.1 and repeat the steps within 224.1 continuously.

Step 224.2 Processing unit (160) will constantly send 24 V power to the primary ice detector probe (120) and monitor its voltage return. If the voltage is 0.75, then no ice is detected. If the voltage is 1.7V, then ice is detected.

Step 224.2.1. If the processing unit (160) does not detect an ice signal, return to step 224.2.

Step 224.2.2 If the processing unit (160) does detect a 1.7V signal, this is a positive detection for ice. The processing unit (160) records this event and the time it occurred.

Step 224.2.2.1 If the 1.7V signal detection event has not been previously detected within a predetermined time interval then the processing unit (160) will send a voltage to the primary ice detection probe (120) that will activate a heating element in the probe (120) and melt ice off the probe (120). Return to step 224.2.

Step 224.2.2.2 If the analog voltage measurement system detects an event within the predetermined time interval, then the processing unit (160) will send a signal to the processing unit and a warning HMI UX display indication UX element to warn the operator that ice formation has been detected.

Step 224.3 Processing unit (160) will constantly monitor voltage from the secondary optical ice sensor (125). If the voltage rises above zero, ice is detected. From 0-0.5V the device is detecting light ice or frost, if the voltage rises from 0.5V to 1.0V it is detecting moderate ice, if the voltage increases from 1.0V to 3.0V heavy ice is detected. When 3.0V is seen, the sensor is completely saturated and no more information can be received from the sensor until the ice has melted from the sensor. A warning signal will be sent when the threshold voltage, set by the user, is met. The HMI UX display will set the alarm to notify the operator that ice formation has been detected.

Step 225.3 Tertiary Icing Detection and Mitigation Process:

Step 225.3.1 The processing unit (160) will monitor Pt (140) voltage for variations greater or less than a predetermined Pt voltage fluctuation value A (e.g., min/max voltage range value).

Step 225.3.1.1 If no voltage fluctuation greater than value A from the Pt (140) probe is detected, return to step 225.3.1.

Step 225.3.1.2 If a detected Pt voltage fluctuation is greater than fluctuation value A from the Pt probe (140), proceed to next step.

Step 225.3.1.3 If Psw probe (130) voltage is fluctuating more than a predetermined Psw voltage fluctuation value B (e.g., min/max voltage range value), return to step 225.3.1 and continue processing.

Step 225.3.1.4 If Psw probe (130) voltage is fluctuating less than voltage fluctuation value B, ice is not detected and processing unit (160) returns to step 225.3.1.

Step 225.3.1.5 If Psw probe (130) voltage is not fluctuating more than voltage fluctuation value B, ice has been detected and processing unit (160) will send a warning to be displayed on the UX alerting the operator that significant ice formation has been detected.

Step 226.3 Quaternary Icing Detection and Mitigation Process:

Step 226.3.1 The processing unit (160) will monitor engine N1 rpm for variations greater or less than a predetermined rpm fluctuation value A (e.g., min/max rpm range value).

Step 226.3.1.1 If no rpm variation greater than value A from engine N1 rpm is detected, return to step 226.3.1.

Step 226.3.1.2 If a detected rpm fluctuation is greater than fluctuation value A from the engine rpm sensor, proceed to next step.

Step 226.3.1.3 If Psw2 probe (51) voltage is fluctuating more than a predetermined Psw2 voltage fluctuation value B (e.g., min/max voltage range value), return to step 226.3.1 and continue processing.

Step 226.3.1.4 If Psw2 probe (51) voltage is fluctuating less than voltage fluctuation value B, ice is not detected and processing unit (160) returns to step 226.3.1.

Step 226.3.1.5 If Psw2 probe (51) voltage is not fluctuating more than voltage fluctuation value B, ice has been detected and processing unit (160) will send a warning to be displayed on the UX alerting the operator that significant ice formation has been detected.

In other embodiments, the methods described herein may alternatively include a step of operating the ice detection test apparatus before starting the turbine engine (as well as methods that do not require starting and running the turbine engine). This will allow the operator to determine whether icing conditions could occur during the engine run without the possibility of damaging the engine. In such a case, the method may use the known maximum airflow value for the engine of interest. That airflow drives a certain Psw pressure. With that, the ice monitor controller can drive the air moving device to that power setting without operating the engine. By doing this, the operator can determine if there is a likelihood of icing before an engine run. The maximum airflow is the airflow at which there is the highest likelihood of icing, and engines are only allowed to operate at that power for a short time.

In such embodiments, the method may comprises the steps of:

a) providing a turbine engine test system comprising a turbine engine test apparatus that simulates the conditions at the air intake of the turbine engine and comprises a first air pressure sensor, and positioning the test apparatus in a location that is spaced away from the turbine engine and is in the presence of air that is representative of the air that will be drawn into the intake of the turbine engine;

b) calculating, or obtaining a calculated value for, the air pressure at the air intake of a turbine engine;

c) moving air through the turbine engine test apparatus to produce an air pressure in the test apparatus that approximates the calculated air pressure at the air intake of the turbine engine; and d) determining whether icing conditions are developing in the test apparatus, and comparing the input from the first air pressure sensor and the calculated air pressure at the air intake of the turbine engine against each other and stored values to determine whether icing conditions would exist on the turbine engine intake if the engine was running.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

EXAMPLES

Example 1

The performance of the system is shown through testing with an F108-GE-100 engine, S/N 711212. All testing is performed in conditions that the Technical Orders (TO) consider to be icing conditions.

Figure 11:
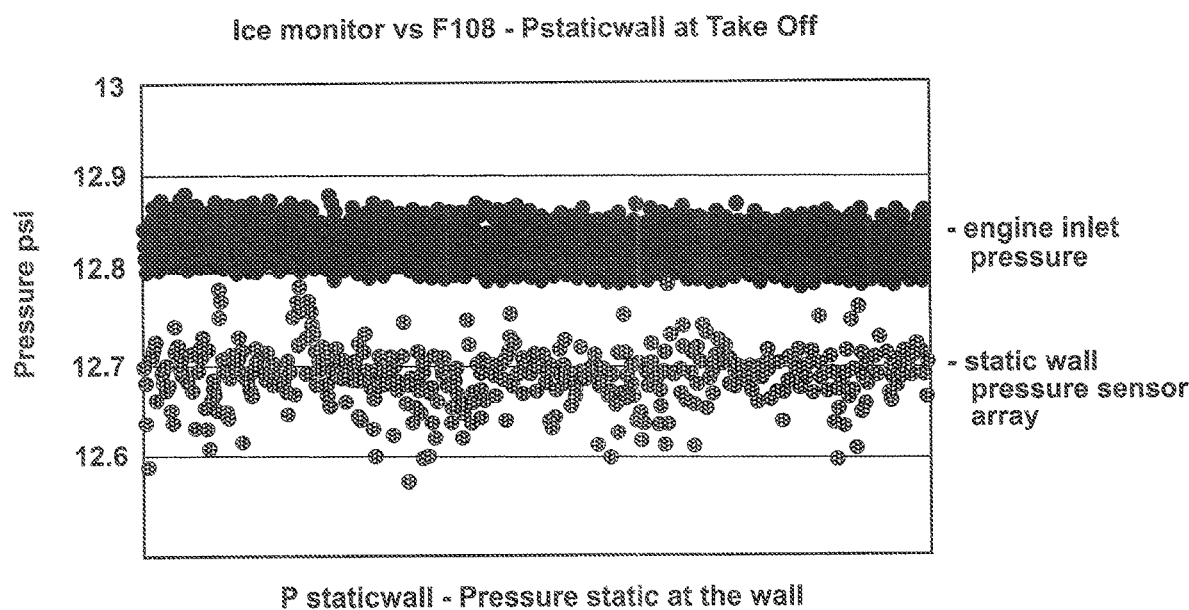
FIG. 11 is a graph that compares the static wall pressures in the ice monitor sensor array (IMSA) and a jet engine to one another.

The first test is performed to show that the static and total pressures inside the C-D structure can match the pressures inside the engine intake utilizing the air drive controller. The engine is taken to takeoff power and the air drive to maximum airflow. FIG. 11 shows the two different pressures and how they compare to one another.

The noisy signal from the IMSA's sensor array $P_{staticwall}$ has been determined to be a result of the static wall sensor machining process. The 1 mm hole has a very small burr that is causing turbulence resulting in a noisy signal.

The ice detection apparatus relies on its ability to make its sensors approximate the environment of the engine intake, the location where ice will form. FIG. 11 shows that the static pressure in the sensor array is able to be driven lower than the engine inlet pressure. This indicates higher airflow speeds in the convergent-divergent structure's throat. In general, lower gas pressures equate to lower temperatures. The ice monitor will be able to reduce the temperature in the convergent-divergent structure to meet or exceed icing conditions in respect to the engine inlet.

Figure 12:
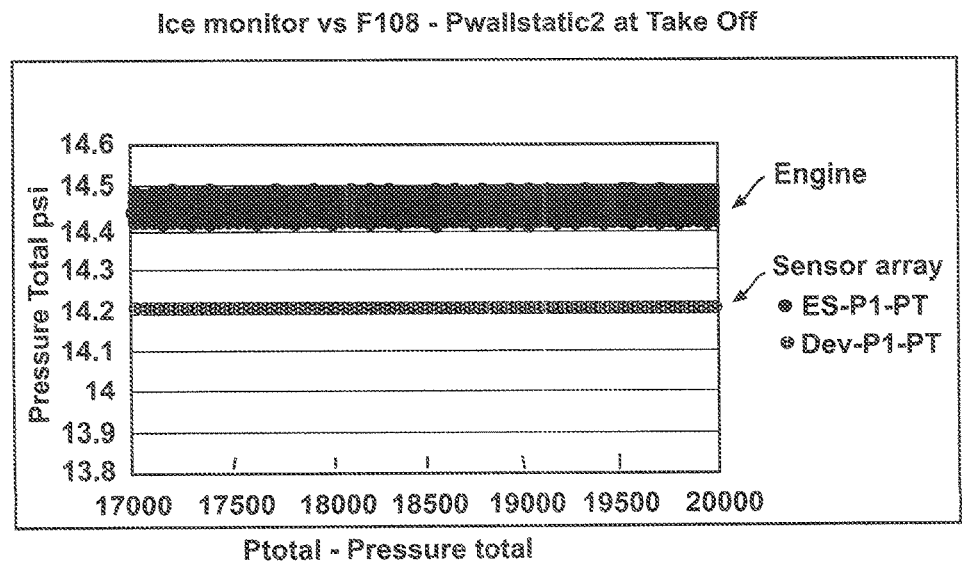
FIG. 12 is a graph that compares the total pressures in the ice monitor sensor array (IMSA) and a jet engine to one another.

FIG. 12 also shows that that total pressure in the IMSA is able to be driven lower than the engine inlet total pressure. This also shows the device is able to meet or exceed airflow per unit area in comparison to the engine inlet.

Example 2

The second test demonstrates the conservative nature of the Technical Orders and the ability of the ice monitor to detect the presence of ice. Testing is performed at takeoff power setting on the engine and the ice monitor is set to match the engine's $P_{staticwall}$ pressure. The engine is run for 5 minutes, which is the maximum amount of time allowed at this power setting. The engine is properly shut down and checked for ice formation. The engine shows no ice accretion, matching the ice monitor's prediction of no ice formed. The ice monitor continues at the $P_{staticwall}$ pressure observed at takeoff power. The ice monitor is allowed to continue running, and at 17 minutes from the start of takeoff airflow, the ice monitor begins detecting ice formation from both the primary and secondary ice sensors. The testing conditions are 36° F. and 39° F. dew point at the start of the test. These conditions are considered icing, even though the outside air temperature is above 32 degrees.

The methods described herein may, thus, include a step of continuing to run the ice detection test apparatus after shutting down the turbine engine to determine whether icing conditions would have occurred if the engine run was extended without the possibility of damaging the engine.

Figure 13:
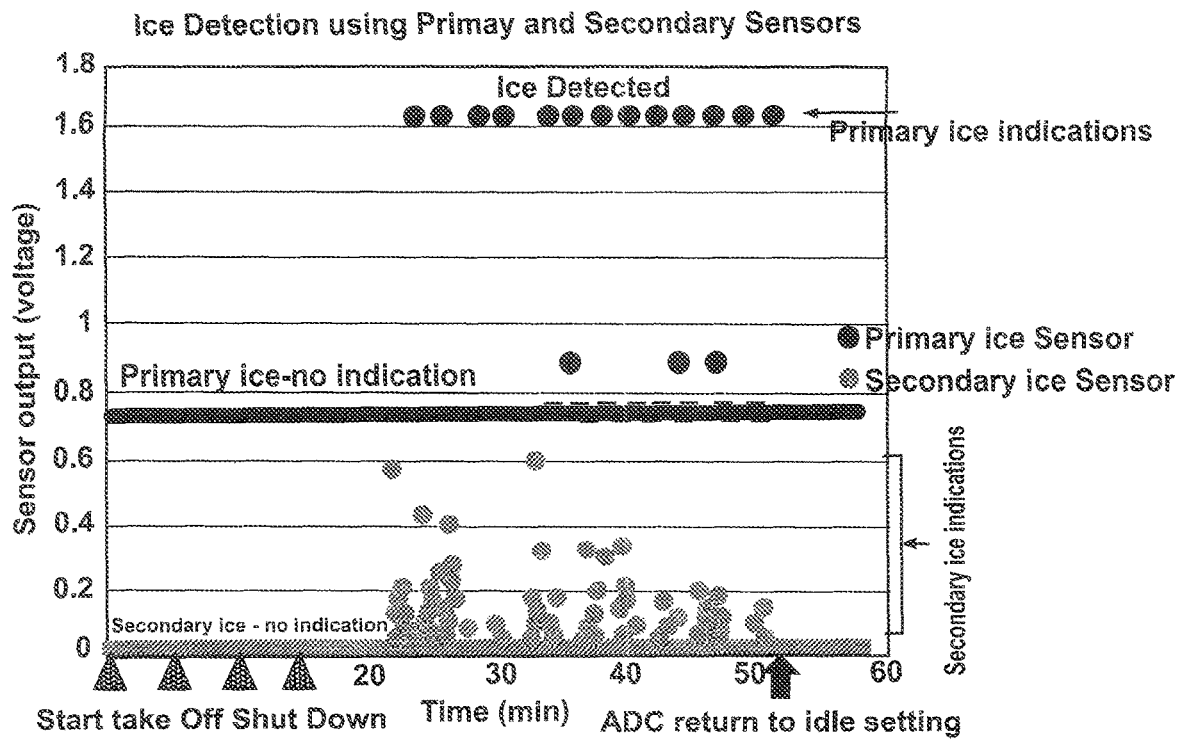
FIG. 13 is a graph that compares the sensitivity of the primary and secondary ice sensors.

FIG. 13 shows the output from the primary ice sensor (Collins) and the secondary ice sensor (New Avionics). These two types of ice sensors are used to determine if they would offer acceptable performance in ice detection for use in this device. The primary sensor shows its ability to detect small amounts of ice while giving a clear and discernible ice alert signal, making false positive indications unlikely. The secondary sensor also shows its ability to detect small amounts of ice, slightly more sensitive than the primary sensor, but its indication is more susceptible to false positive indications. These sensors output a low voltage when no ice is present. Once ice is detected the voltage jumps, indicating ice has formed. The primary sensor jumps from 0.75V to a set voltage of 1.65V when ice is detected. It waits 1 minute, and then melts the ice off using an onboard heater. The secondary sensor output is proportional to the amount of ice detected. Its output is categorized as 0-0.5V is ice detected, 0.5-1.0V is moderate ice detected, 1.0-3.0V has heavy ice, and 3.0V is the saturation value. The primary sensor shows thirteen indications of ice, with 13 heat cycles freeing the sensor for continued operation. The sensor is programmed to wait 60 seconds and then heat the probe. The secondary sensor is not quantitative but is more sensitive to light ice or frost formation giving a quicker notice of ice formation.

The use of the two $P_{staticwall}$ probes as ice indicators is also tested to validate their function. Once the small hole is blocked by ice, the pressure transducer will no long sense the freestream air, the source of the reduced pressure. As a result of this, the pressure will slowly begin to rise, no longer reacting to increases or decreases in airflow. The system may, therefore, use both Pstaticwall probes to continuously monitor both the engine and IMSA for ice formation.

Example 3

The third test validates the ice monitor controller's (IMCs') ability to control the airflow in the ice monitor sensor array (IMSA) to match engine monitoring reporter (EMR) pressures. The onboard software located in the IMC is able to receive EMR and IMSA outputs and drive the ADC so similarity can be maintained throughout the engine run. The EMR continuously monitors pressures and passes that information to the IMC. The IMC also taking in pressure data from the IMSA and calls for the ADC to increase or decrease airflow, keeping pressures synchronized. The user also has the ability to drive the ADC at higher airflows, giving a conservative prediction of ice formation. This process may be done without user input and the result is shown in FIG. 14 with the engine going from idle to takeoff and back to idle at 0.5 degree/second power lever angle (PLA) (i.e., the jet engine throttle).

Figure 14:
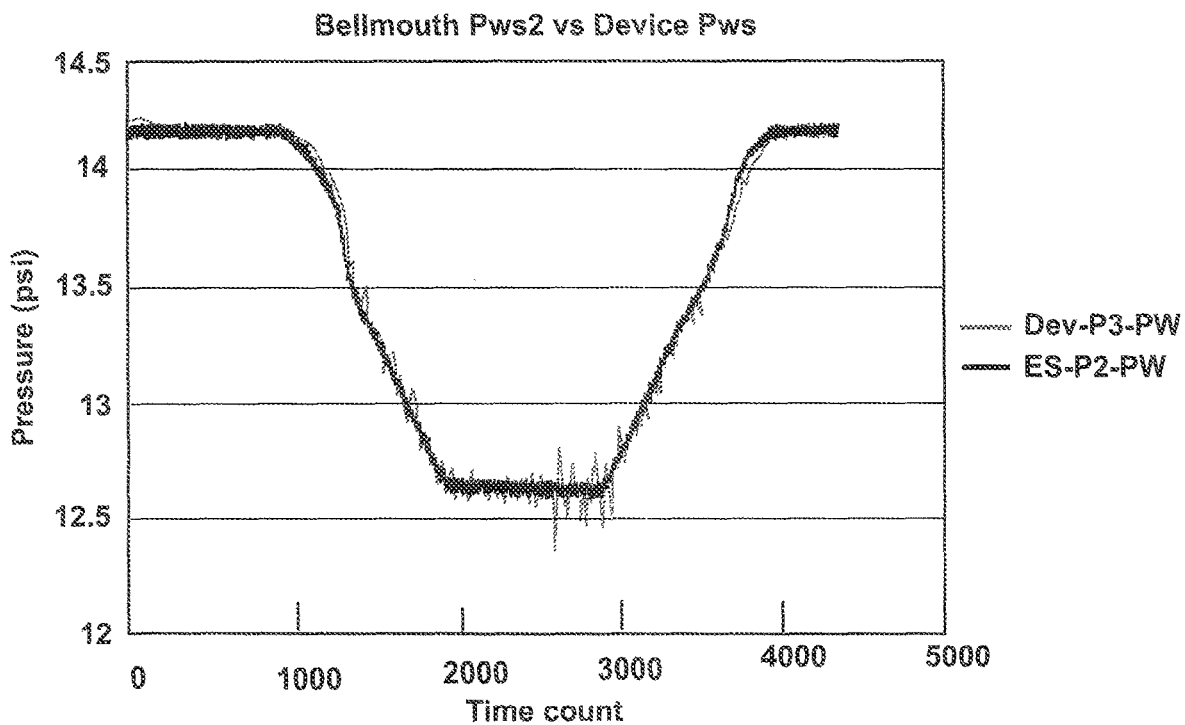
FIG. 14 is a graph that shows the ability of the ice monitor control (IMC) to control airflow in the ice monitor sensor array (IMSA) to match the jet engine inlet pressures.

FIG. 14 shows tracking by the IMC, and varying the ADC hertz output to the drive motor. The IMC is able to track all throttle movements required in the TO, except the snap acceleration from flight idle to takeoff in 5 seconds or less. The current setup can achieve that snap acceleration in 7 seconds. This could be corrected with a larger VFD.

In summary, this new method for ice formation monitoring is capable of matching or exceeding the engine inlet conditions during testing. It is shown that as a result of air accelerating into the intake of the engine, temperatures will drop and ice will form in condition where ambient temperatures are above 32 degrees. The monitor has also shown its ability to track the engine inlet conditions without user input.

The ice monitor's primary and secondary sensors are successful in detecting ice. The ice monitor's primary and secondary sensors, along with the two $P_{staticwall}$ sensors provide four different methods of ice detection, any one of them can be used to alert the operators of potentially hazardous condition. The construction of the ice monitor is made of aviation grade components and is constantly performing data quality checks to ensure all its functions are working correctly. If there is a failure of one of the systems, the operator will be notified of the status of the system failure, specifying which part has failed.

The system and method described herein can provide a number of advantages. It should be understood, however, that these advantages need not be required unless they are set forth in the appended claims.

The system provides a new tool to predict icing conditions and to notify the operator so action can be taken before damage to an engine can occur. The system and method uses the jet engine ice detection test apparatus to simulate icing conditions in the inlet of a jet engine during testing in parallel with the jet engine test. It is generally not feasible to simply add an icing sensor to the inlet of a jet engine being tested. The addition of an icing sensor in the inlet of a jet engine would cause many issues with jet engine tests. For example, whenever the airflow changes in the airflow path of a jet engine, there has to be a new correlation survey that is usually performed by the OEM. The cost of re-correlation surveys is very high and can be in the range of hundreds of thousands of dollars per engine to $1,000,000 or more per engine. In addition, some engines use aircraft intakes where modification would not be permitted. In the present system, the ice detection sensors are not required to be mounted on the engine or inside the test cell. It does not require modification of the engine inlet or any workhorse equipment. The ice detection apparatus does not change airflow inside the test area so it will not require a re-correlation. The system and method described herein do not change the existing airflow/correlation factors, and do not introduce FOD risks. The system and method described herein can detect ice accretion in the engine before, or during ice accretion depending on the setup of the system.

The use of the ice detection test apparatus, measuring for ice accretion instead of utilizing predictive TO tables is expected to recover 75% of lost time due to icing conditions. For example, Tinker Air Force Base typically sees 30 days of downtime due to expected icing conditions. This tool has the potential of reducing the 30 days to only 7 days where icing truly is occurring. This will improve readiness for the military by allowing timelier testing during the winter months, without sacrificing safely of the engine.

There are numerous, non-limiting embodiments of the invention. All embodiments, even if they are only described as being "embodiments" of the invention, are intended to be non-limiting (that is, there may be other embodiments in addition to these), unless they are expressly described as limiting the scope of the invention. Any of the embodiments described herein can also be combined with any other embodiments in any manner to form still other embodiments.

Unless specifically stated otherwise, the terms "a", "an", and "the" include "at least one".

The terms "coupled" and "joined", as used herein, encompass configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element. The terms "coupled" and "joined" include both those configurations in which an element is temporarily joined to another element, or in which an element is permanently joined to another element.

It should be understood that every maximum numerical limitation given throughout this specification includes every lower numerical limitation, as if such lower numerical limitations were expressly written herein. Every minimum numerical limitation given throughout this specification includes every higher numerical limitation, as if such higher numerical limitations were expressly written herein. Every numerical range given throughout this specification includes every narrower numerical range that falls within such broader numerical range, as if such narrower numerical ranges were all expressly written herein.

Although the invention has been described in detail with reference to certain preferred embodiments, variations and modifications exist within the spirit and scope of the invention as described and defined in the following claims.

What is claimed is:

1. A turbine engine ice detection test apparatus comprising: an engine pressure simulation device configured for simulating conditions at an air intake of a turbine engine; an air moving device connected to said engine pressure simulation device for moving air through said engine pressure simulation device, wherein the air moving device is configured to adjust the air flow through the engine pressure simulation device to approximate to engine pressures of a turbine engine being tested; and a first air pressure sensor disposed relative to said engine pressure simulation device to measure pressure of air passing through the engine pressure simulation device.

2. The turbine engine ice detection test apparatus of claim 1, the engine pressure simulation device comprises one of an air convergence-divergence structure or a venturi tube.

3. The turbine engine ice detection test apparatus of claim 2, wherein said engine pressure simulation device comprises an air convergence-divergence structure having an inlet, an outlet, a length extending between said inlet and said outlet, and a narrowed throat portion between said inlet and said outlet.

4. The turbine engine ice detection test apparatus of claim 3, wherein the inlet has a cross-sectional area and the throat has a cross-sectional area, and the cross-sectional area of the inlet is between about 2 and 100 times the cross-sectional area of the throat.

5. The turbine engine ice detection test apparatus of claim 3, wherein the throat portion of said air convergence-divergence structure is located closer to said inlet than to said outlet.

6. The turbine engine ice detection test apparatus of claim 3, wherein the first air pressure sensor is located in the throat of said air convergence-divergence structure.

7. The turbine engine ice detection test apparatus of claim 1, wherein said first air pressure sensor comprises a first static wall pressure sensor.

8. The turbine engine ice detection test apparatus of claim 1, wherein said first air pressure sensor comprises part of a first set of sensors, and said first set of sensors comprises a first ice sensor in addition to said first air pressure sensor.

9. The turbine engine ice detection test apparatus of claim 8, wherein the first set of sensors additionally comprises at least one of a secondary ice sensor and a total pressure sensor.

10. A turbine engine ice detection system comprising:
the turbine engine ice detection test apparatus of claim 1; and
an ice monitor controller in communication with said first air pressure sensor and with at least one second sensor located adjacent a turbine engine intake, wherein said ice monitor controller is also in communication with said air moving device, and said ice monitor controller is configured to operate the air moving device and receive inputs from the first air pressure sensor and said at least one second sensor, and perform comparisons of inputs from the first air pressure sensor and said at least one second sensor against each other and stored values to determine whether actual icing conditions exist on a turbine engine intake.

11. The system of claim 10, wherein said ice monitor controller is configured to operate said air moving device in a manner so that the conditions at the engine pressure simulation device approximate those at the at least one second sensor.

12. An ice detection system for use in a turbine engine test cell, the test cell includes a test cell air intake and an air ducting structure providing an air path between the test cell air intake and a turbine engine, wherein said turbine engine has an air intake and a static wall air pressure sensor positioned adjacent to the turbine engine air intake to measure pressure of air passing into the turbine engine intake, which is a second air pressure sensor, said ice detection system comprising: a turbine engine ice detection test apparatus positioned in proximity to the test cell intake section, wherein the turbine engine ice detection test apparatus comprises: an engine pressure simulation device configured for simulating conditions at the air intake of a turbine engine; an air moving device connected to said engine pressure simulation device for moving air through said engine pressure simulation device, wherein the air moving device is configured to adjust the air flow through the engine pressure simulation device to approximate to engine pressures of a turbine engine being tested; and a first set of sensors disposed relative to said engine pressure simulation device to measure pressure of air passing through the engine pressure simulation device, wherein the first set of sensors comprises a first static wall pressure sensor and a first ice sensor; and a controller in communication with said first set of sensors and said second air pressure sensor that receives inputs from the first set of sensors and said second air pressure sensor and performs comparisons of inputs from the first set of sensors and said second air pressure sensor against each other and stored values to determine whether actual icing conditions exist.

13. The ice detection system of claim 12, wherein the controller is configured to operate said air moving device so that the air moving device produces an air pressure in said engine pressure simulation device that approximates to air pressure at the air intake of the engine being tested.

14. A method of ice detection on a turbine engine, wherein the turbine engine has an air intake and draws air from an outside environment, said method comprising the steps of: a. providing a turbine engine test system comprising a turbine engine test apparatus that simulates conditions at the air intake of the turbine engine and comprises a first air pressure sensor, and positioning said test apparatus in a location that is spaced away from the turbine engine and is in the presence of air that is representative of the air that will be drawn into the intake of the turbine engine; b. running the turbine engine so that air moves through its air intake, and receiving information on the air pressure at the air intake; c. moving air through the turbine engine test apparatus to produce an air pressure in said test apparatus that approximates to air pressure at the air intake of said turbine engine: and d. determining whether icing conditions are developing in said test apparatus, and comparing inputs from the first air pressure sensor and the information on the air pressure at the air intake of the turbine engine against each other and stored values to determine whether actual icing conditions exist on the turbine engine intake.

15. The method of claim 14, wherein step (d) involves at least one of the following: determining whether icing conditions are developing in said test apparatus by monitoring the first air pressure sensor for icing;
and deriving the information on the air pressure at the air intake of the turbine engine from N1 RPM speed of the engine.

16. The method of claim 14, wherein: the turbine engine test apparatus comprises a first set of sensors comprising the first air pressure sensor, which is a static wall pressure sensor, and further comprising a first ice sensor; the turbine engine described in step (b) is provided with at least one second air pressure sensor located adjacent said air intake; and step (d) comprises comparing inputs from the first set of sensors and said at least one second sensor against each other and stored values to determine whether actual icing conditions exist on the turbine engine intake.

17. The method of claim 14, wherein upon the air pressure in said test apparatus is greater than the turbine engine air pressure, increasing air flow through said test apparatus.

18. The method of claim 14, wherein upon the air pressure in said test apparatus is less than the turbine engine air pressure, decreasing air flow through said test apparatus.

19. The method of claim 14, wherein the turbine engine test system further comprises an ice-melting mechanism in proximity to said first air pressure sensor, and an operator interface that allows an operator to select one of the following modes of operation: manual, semi-manual, and automatic.

20. The method of claim 19, wherein upon manual mode is selected, the operator is provided with an alert when ice is detected, and the operator may activate the ice-melting mechanism to melt ice at least on said first air pressure sensor.

21. The method of claim 19, wherein upon semi-manual mode is selected, the operator is provided with an alert when ice is detected, and the ice-melting mechanism is automatically activated, and: (1) upon multiple ice detections occur outside a predetermined time interval, the ice-melting mechanism is automatically activated, and the operator is requested to input whether it is intend to continue to run the engine, or terminate the engine run; and (2) upon ice is detected within the predetermined time interval after a previous positive ice indication and operator warning, the operator will be directed to drive an engine throttle to idle and start shutdown procedures.

22. The method of claim 19, wherein upon automatic mode is selected, the operator is provided with an alert when ice is detected, and the ice-melting mechanism is automatically activated, and: (1) upon multiple ice detections occur within a predetermined time interval, the ice-melting mechanism is automatically activated without asking the operator for input thereby allowing continued testing; and (2) upon additional ice detections are detected within a selected time frame of a previous multiple positive ice indication, the system will: warn the operator of icing detection; display a warning suggesting the operator drive an engine throttle to idle operation; and display an instruction to the operator to proceed with an emergency engine shutdown.

* * * * *